(12) United States Patent
Kamishima et al.

(10) Patent No.: US 6,415,108 B1
(45) Date of Patent: Jul. 2, 2002

(54) PHOTOGRAPHY DEVICE

(75) Inventors: Gakuzi Kamishima, Hino; Daikichi Morohashi, Hachioji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/482,964

(22) Filed: Jan. 13, 2000

(30) Foreign Application Priority Data

Jan. 18, 1999 (JP) .............................................. 11-009307

(51) Int. Cl.⁷ .......................... G03B 17/24; G03B 17/48
(52) U.S. Cl. ...................... 396/312; 396/287; 396/315; 396/429; 348/232; 355/40
(58) Field of Search ................................. 396/312, 315, 396/287, 296, 311, 429, 310; 348/232, 333.01, 333.02, 333.03, 333.04, 333.11, 333.12; 355/40, 41; 369/14; 358/906.1, 909.1

(56) References Cited

U.S. PATENT DOCUMENTS

| 5,276,472 A | | 1/1994 | Bell et al. | |
|---|---|---|---|---|
| 5,363,157 A | | 11/1994 | Cocca | |
| 5,489,955 A | * | 2/1996 | Satoh et al. | 396/312 |
| 5,644,557 A | | 7/1997 | Akamine et al. | |
| 5,655,164 A | * | 8/1997 | Tsai | 396/312 |
| 5,771,414 A | * | 6/1998 | Bowen | 396/312 |
| 5,774,752 A | * | 6/1998 | Patton et al. | 396/312 |
| 5,896,403 A | | 4/1999 | Nagasaki et al. | |
| 6,128,037 A | * | 10/2000 | Anderson | 348/232 |
| 6,163,656 A | * | 12/2000 | Yoshioka | 396/312 |

FOREIGN PATENT DOCUMENTS

| JP | 60-244146 | 12/1985 |
|---|---|---|
| JP | 7-120832 | 5/1995 |

* cited by examiner

Primary Examiner—Alan A. Mathews
(74) Attorney, Agent, or Firm—Frishauf, Holtz, Goodman & Chick, P.C.

(57) ABSTRACT

The user a mode setting section to optionally set one of a first mode that enables a predetermined operation necessary for recording, on the printing medium, a voice code image based on the voice input by the voice input section, and a second mode that disables the predetermined operation necessary for recording, on the printing medium, the voice code image based on the voice input by the voice input section. The mode set by the mode setting section is displayed on a display section incorporated in an output section. The predetermined operation that can be executed when the first mode is set is, for example, a voice input operation by a voice input section, a conversion operation by a digital conversion section, and a compression operation by a voice compression section.

6 Claims, 20 Drawing Sheets

FIG. 11

| RECORD NO. | VOICE REGIS- TRATION NUMBER | PHOTOG- RAPHY FRAME NUMBER | VOICE CODE RECORDING POSITION | DATE | TIME | INPUT PERIOD | START ADDRESS | DATA SIZE | COMPRESSION METHOD | COMMENTS |
|---|---|---|---|---|---|---|---|---|---|---|
| 1 | 1 | 1 | 1 | 1998.08.10 | 11:00 | 10sec | | | | |
| 2 | 2 | 0 | | 1998.08.10 | 11:05 | 10sec | | | | |
| 3 | 3 | 2 | 1 | 1998.08.11 | 20:31 | 6sec | | | | |
| 4 | 4 | 5,6 | 3,1 | 1998.08.11 | 20:32 | 5sec | | | | |
| ... | ... | ... | ... | ... | ... | | | | | |

{307 = RECORD NO. / VOICE REGISTRATION NUMBER columns; 308 = RELATING DATA (PHOTOGRAPHY FRAME NUMBER, VOICE CODE RECORDING POSITION, DATE, TIME) and remaining columns}

| RECORD NO. | PHOTOG- RAPHY FRAME NUMBER | DATE | TIME | RESOLUTION | COLOR | START ADDRESS | DATA SIZE | COMPRESSION METHOD |
|---|---|---|---|---|---|---|---|---|
| 1 | 1 | 1998.08.10 | 11:00 | 1208×1024 | 8bit | | | |
| 2 | 2 | 1998.08.10 | 11:05 | 960×800 | 8bit | | | |
| 3 | 3 | 1998.08.11 | 20:30 | 1024×768 | 8bit | | | |
| 4 | 4 | 1998.08.11 | 20:32 | 800×600 | 16bit | | | |
| ... | ... | ... | ... | ... | ... | | | |

{309 = RECORD NO. / PHOTOGRAPHY FRAME NUMBER; 310 = remaining columns}

301 — VOICE DATA HEADER SECTION
- VOICE DATA WITH VOICE REGISTRATION NUMBER 1
- VOICE DATA WITH VOICE REGISTRATION NUMBER 2
- VOICE DATA WITH VOICE REGISTRATION NUMBER 3
- VOICE DATA WITH VOICE REGISTRATION NUMBER 4
- ......

IMAGE DATA HEADER SECTION
- IMAGE DATA WITH PHOTOGRAPHY FRAME NUMBER 1
- IMAGE DATA WITH PHOTOGRAPHY FRAME NUMBER 2
- IMAGE DATA WITH PHOTOGRAPHY FRAME NUMBER 3
- IMAGE DATA WITH PHOTOGRAPHY FRAME NUMBER 4
- ......

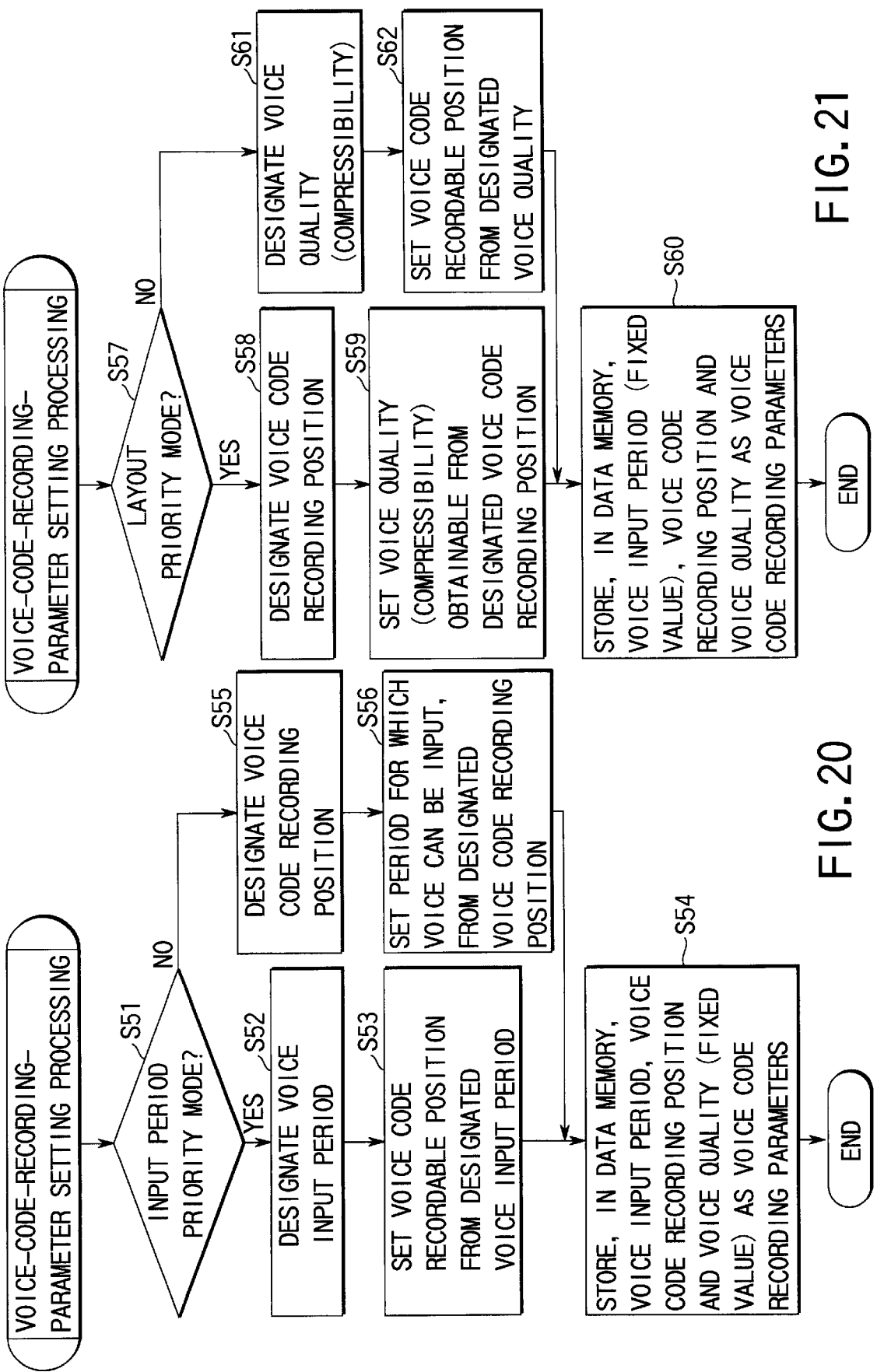

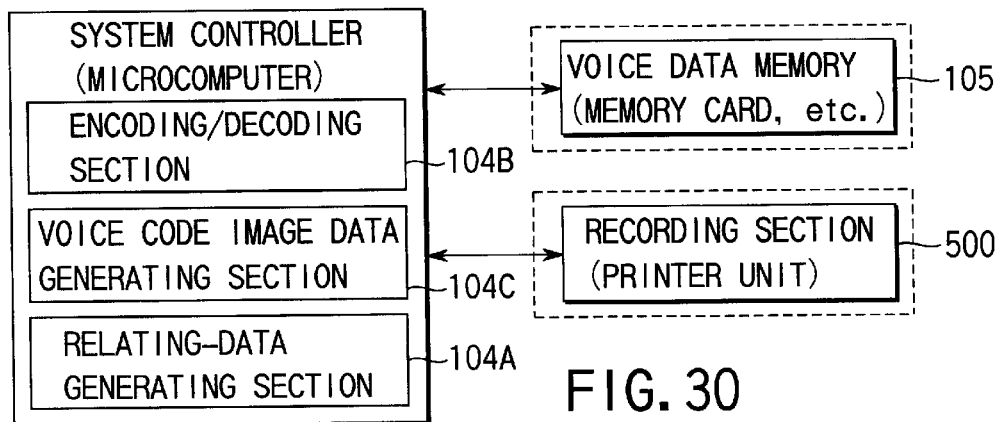
FIG. 30
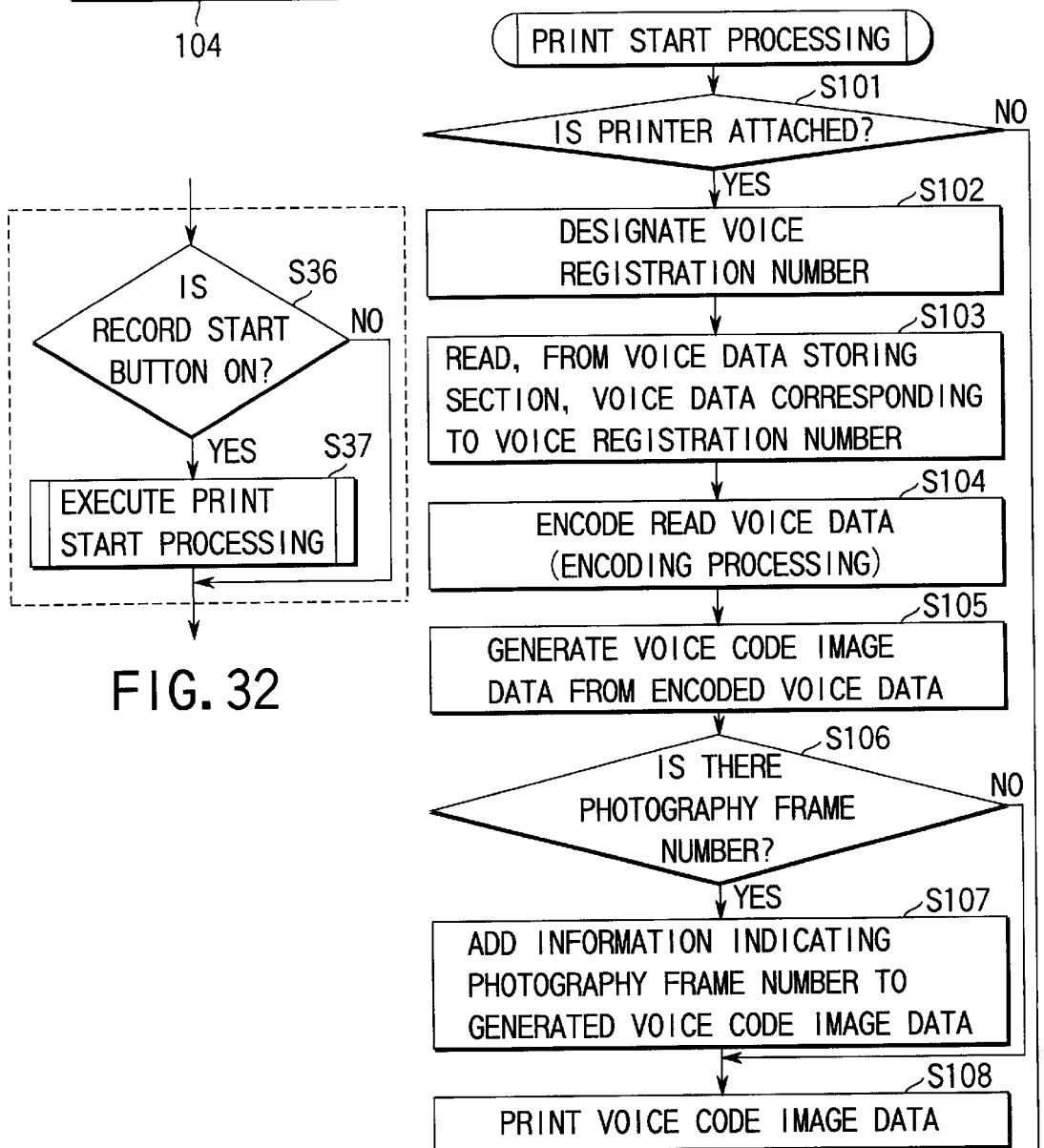
FIG. 32
FIG. 33

PHOTOGRAPHY DEVICE

BACKGROUND OF THE INVENTION

This invention relates to a photography device, such as a film-type camera, an electronic still camera, etc., for use in a photography image processing system capable of recording an optically readable voice code image on a printing medium on which a photographed still image is to be recorded.

Various types of photography image processing systems are known which can record an optically readable voice code image, such as a one- or two-dimensional bar code, on a printing medium on which a photographed still image is to be recorded.

For example, such systems are disclosed in Japanese Patent Application KOKAI Publications Nos. 60-244146, 224320 (corresponding to U.S. Pat. No. 5,276,472), 6-231466 (corresponding to U.S. Pat. No. 5,896,403), 7-64215 (corresponding to U.S. Pat. No. 5,363,157), 7-120832, 7-181606 (corresponding to U.S. Pat. No. 5,644,557), etc.

In the photography image processing systems disclosed in the above publications, an optically readable voice code image is recorded on a printing medium. In other words, a photographed still image and a voice can be recorded together on a printing medium such as a paper sheet. Accordingly, the user can easily and instantly hear a voice while seeing a picture, using, for example a dedicated reader for reading voice code image.

Thus, the user can enjoy images and voices in a different manner from the manner in which they appreciate those recorded as image and voice signals in a magnetic recording medium that is used in the form of a tape in, for example, a video movie camera.

In particular, U.S. Pat. Nos. 5,896,403 and 5,644,557 mentioned above disclose a dot code recorded as an optically readable voice code image on a printing medium such as a paper sheet, together with a photographed still image.

FIG. 1 illustrates the format of a dot code 1 as disclosed therein.

As shown, the dot code 1 consists of a plurality of blocks 2 arranged two-dimensionally. Each block 2 has a data area 3 in which white and black dots corresponding to respective values "0" and "1" obtained by dividing, in units of one block, data that indicates a voice are arranged in a predetermined manner; markers 5 arranged at the four corners of each block 2 for finding reference points to detect each dot (data dot 4) in the data area 3, each marker making of a predetermined number of black dots; and a block address pattern 6 arranged between each pair of adjacent markers and including an error detecting sign or an error correcting sign.

Even if the entire dot code 1 is larger than the imaging field of a reading means (not shown), its reading can be executed by manually moving the reading means on the code to sequentially pick up divided images of the code. In other words, even where the entire dot code 1 cannot be photographed at one time, the data of the entire code can be reconstructed if each address assigned to a corresponding one of the blocks 2 is read and recognized.

Accordingly, the above dot code can record voice information on, for example, a paper sheet, which cannot be realized by the conventional one- or two-dimensional bar code. This dot code is expected to be used as a future code image that will be particularly suitable for the photography image processing system.

However, a photography device for use in photography image processing systems has room for improvement.

When actually executing photography, inputting a voice for creating a voice code image in relation to a to-be-photographed still image, or executing processing for the creation of the voice code image in relation to the still image is not always performed.

In light of this, it is necessary to set the photography device before photography so that the photographer can simply and reliably select processing for recording a voice code image on a printing medium, or not.

This kind of setting is not disclosed in the above-described publications.

BRIEF SUMMARY OF THE INVENTION

The present invention has been developed in light of the above, and aims to provide a photography device for use in photography image processing systems as described above, which enables the photographer to simply and reliably select processing for recording a voice code image on a printing medium or not, thereby significantly enhancing the operability of the device.

According to an aspect of the present invention, there is provided a photography device for use in a photography image processing system which can print an optically readable voice code image on a printing medium on which a photographed still image is to be printed, comprising:

a voice input section for inputting a voice corresponding to the voice code image;

a mode setting section for setting one of a first mode that enables a predetermined operation necessary for recording, on the printing medium, a voice code image based on the voice input by the voice input section, and a second mode that disables the predetermined operation necessary for recording, on the printing medium, the voice code image based on the voice input by the voice input section; and a display section for displaying whether the first mode or the second mode is set by the mode setting section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 11 is a storage format used in an image data memory;

FIG. 20 is a flowchart useful in explaining voice-code-recording-parameter setting processing shown in FIG. 16, which is executed when the voice quality is fixed;

FIG. 21 is a flowchart useful in explaining voice-code-recording-parameter setting processing shown in FIG. 16, which is executed when the input period is fixed;

FIG. 30 is a view illustrating a characterizing section of a silver film camera to which a photography device according to a fourth embodiment is applied;

FIG. 32 is a view showing a changed portion of a main flowchart used in the fourth embodiment; and FIG. 33 is a flowchart for explaining printing start processing shown in FIG. 32.

DETAILED DESCRIPTION OF THE INVENTION

The concept of the present invention will be explained before describing the embodiments of the invention in detail.

Figure 2:
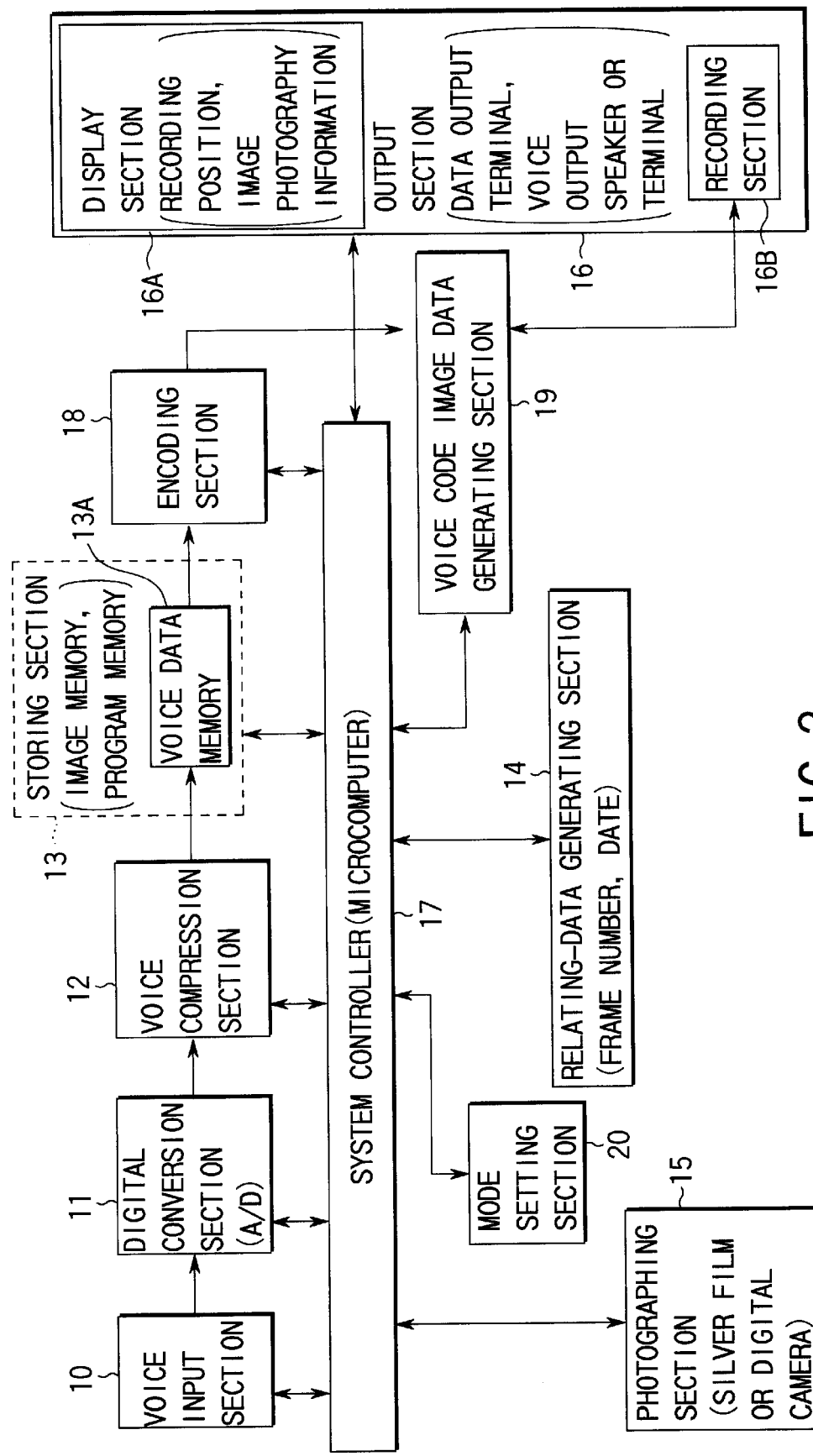
FIG. 2 is a block diagram useful in explaining the concept of a photography device according to the invention.

As is shown in FIG. 2, a photography device according to the invention comprises a voice input section 10, a digital conversion section 11, a voice compression section 12, a storing section 13, a relating-data generating section 14, a photographing section 15, an output section 16, a system controller 17, an encoding section 18, a voice code image data generating section 19 and a mode setting section 20.

In the photography device of the invention, a voice input through the voice input section 10 and corresponding to a voice code image is converted into a digital voice signal by the digital conversion section 11, then compressed by the voice compression section 12, and stored as voice data in the storing section 13. Further, the relating-data generating section 14 generates data for relating, to each other, a photographed still image and a voice code image recorded on the same printing medium. The storing section 13 stores the generated data in relation to voice data related thereto.

Figure 3:
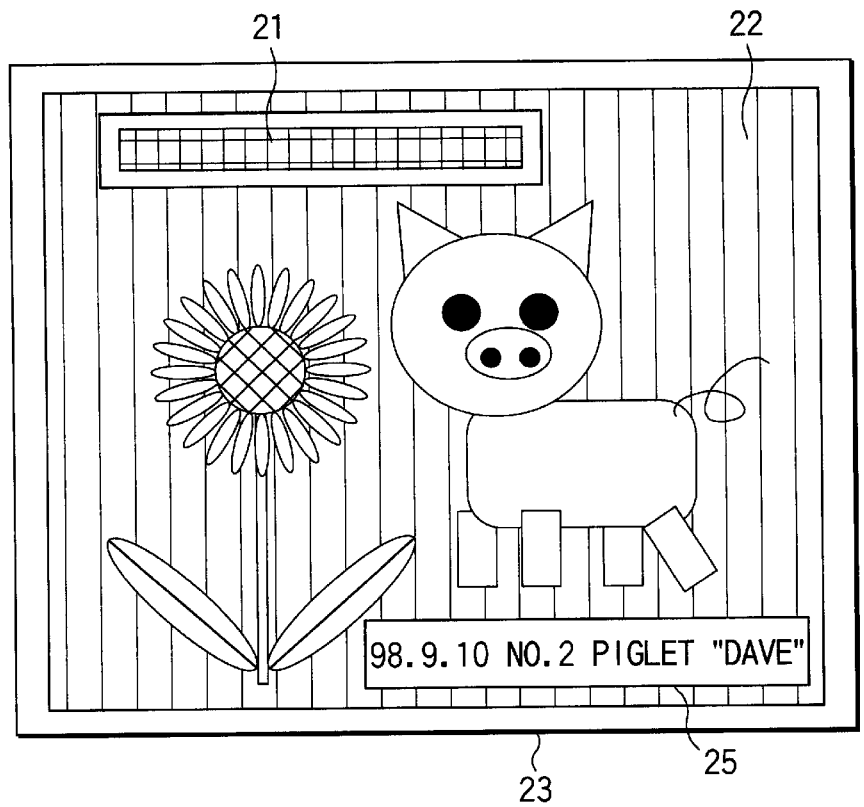
FIG. 3 is a view illustrating an arrangement of a voice code image and relating data on a printing medium on which a photographed still image is recorded.
Figure 4:
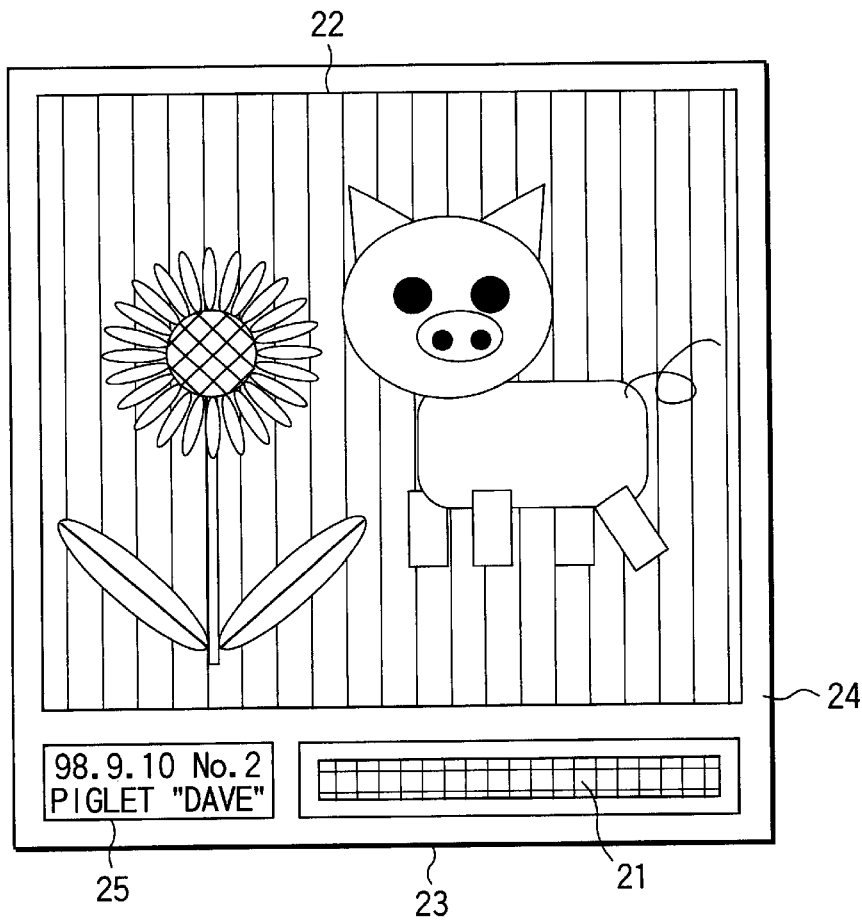
FIG. 4 is a view illustrating another arrangement of a voice code image and relating data on a printing medium on which a photographed still image is recorded.

The photography device of the invention is used in a photography image processing system that can record an optically readable voice code image 21 on a printing medium 23 on which a photographed still image 22 is recorded, as shown in FIG. 3 or 4. FIG. 3 shows a case where the voice code image 21 and the relating data are recorded in the photographed still image 22. FIG. 4 shows a case where the voice code image 21 and the relating data are recorded in a margin 24 of a printing medium. The margin 24 may be defined beforehand in the printing medium outside an area for the photographed still image 22, or may be formed outside the image 22 when recording the image 22.

The relating data is used to relate, to each other, the voice code image 21 and the photographed still image 22 which are to be recorded on the same printing medium 23, and is recorded in a relating-data recording section 25 together with information thereon. In FIGS. 3 and 4, "No. 2" out of "98.9.10 No. 2 Piglet 'Dave'" is the relating data and indicates the frame number of the photographed still image 22. Further, date "98.9.10" and letters "Piglet 'Dave'" indicate the information concerning the relating data. The letters "Piglet 'Dave'" can be replaced, by the relating-data generating section 14, with any other letters such as the name of a place that the photographer visited. The relating-data generating section 14 also generates recording position information, as information concerning the relating data, which indicates the position in which the voice code image is recorded and the position optionally designated by the relating-data recording section 25, thereby storing it in the storing section 13.

The photographing section 15 has a similar photographing mechanism to a known silver film camera or to a known electronic still camera called a digital camera. Where the photography device of the invention is applied to a silver film camera, the storing section 13 is formed as a voice data memory 13A fixed or detachably installed in the camera. On the other hand, where the photography device of the invention is applied to an electronic still camera, the storing section 13 is formed of a fixed or detachable image data memory, which is usually installed in the electronic still camera. Instead of the voice data memory 13A or the image data memory, a program memory can be used which stores operation programs for the system controller 17 as a microcomputer.

The output section 16 is formed of a data output terminal for outputting, to the outside, the voice data, the relating data and information associated therewith which are stored in the storing section 13, or is formed of a voice outputting speaker or terminal for outputting the voice data. The output section 16 includes a display section 16A, and hence can display image photography information such as focusing, or display a recording position so that the photographer can designate any optional position when the relating-data generating section 14 generates the recording position information.

The encoding section 18 subjects voice data from the storing section 13, to 8–10 modulation processing and error-correcting/encoding processing that uses the Read Solomon encoding, thereby generating data suitable for recording. The voice code image data generating section 19 creates voice co de image data corresponding to the voice code image 21, from voice encoded data output from the encoding section 18. The output section 16 includes a recording section 16B, such as a label printer, for recording the voice code image 21 on a recording medium such as a label printing medium on the basis of the voice code image data generated by the voice code image data generating section 19. Where the photography device is applied to an electronic still camera, it is a matter of course that the recording section 16B may be of a type which can record the photographed still image 22 and the voice code image 21 on the printing medium 23 as shown in FIGS. 3 and 4. This is because the image data memory as the storing section 13 also stores image data of the photographed image.

The mode setting section 20 enables the photographer to optionally set one of a first mode for enabling a predetermined operation necessary for recording the voice code image 21 on the printing medium 23, and a second mode for disabling the predetermined operation necessary for recording the voice code image 21 on the printing medium 23. The mode set by the mode setting section 20 is displayed on the display section 16A of the output section 16.

The predetermined operation that can be executed when the first mode is set indicates any operation executed by the voice input section 10, the digital conversion section 11 and the voice compression section 12.

Alternatively, the predetermined operation indicates any operation executed by the voice input section 10, the digital conversion section 11, the voice compression section 12 and the encoding section 18.

Yet alternatively, the predetermined operation indicates any operation executed by the voice input section 10, the digital conversion section 11, the voice compression section 12, the encoding section 18 and the voice code image data generating section 19.

Alternatively, the predetermined operation indicates any operation executed by the voice input section 10, the digital conversion section 11, the voice compression section 12, the encoding section 18, the voice code image data generating section 19 and the recording section 16B.

Each of the above-mentioned cases will be described with reference to the accompanying drawings.

[First Embodiment]

Figure 5:
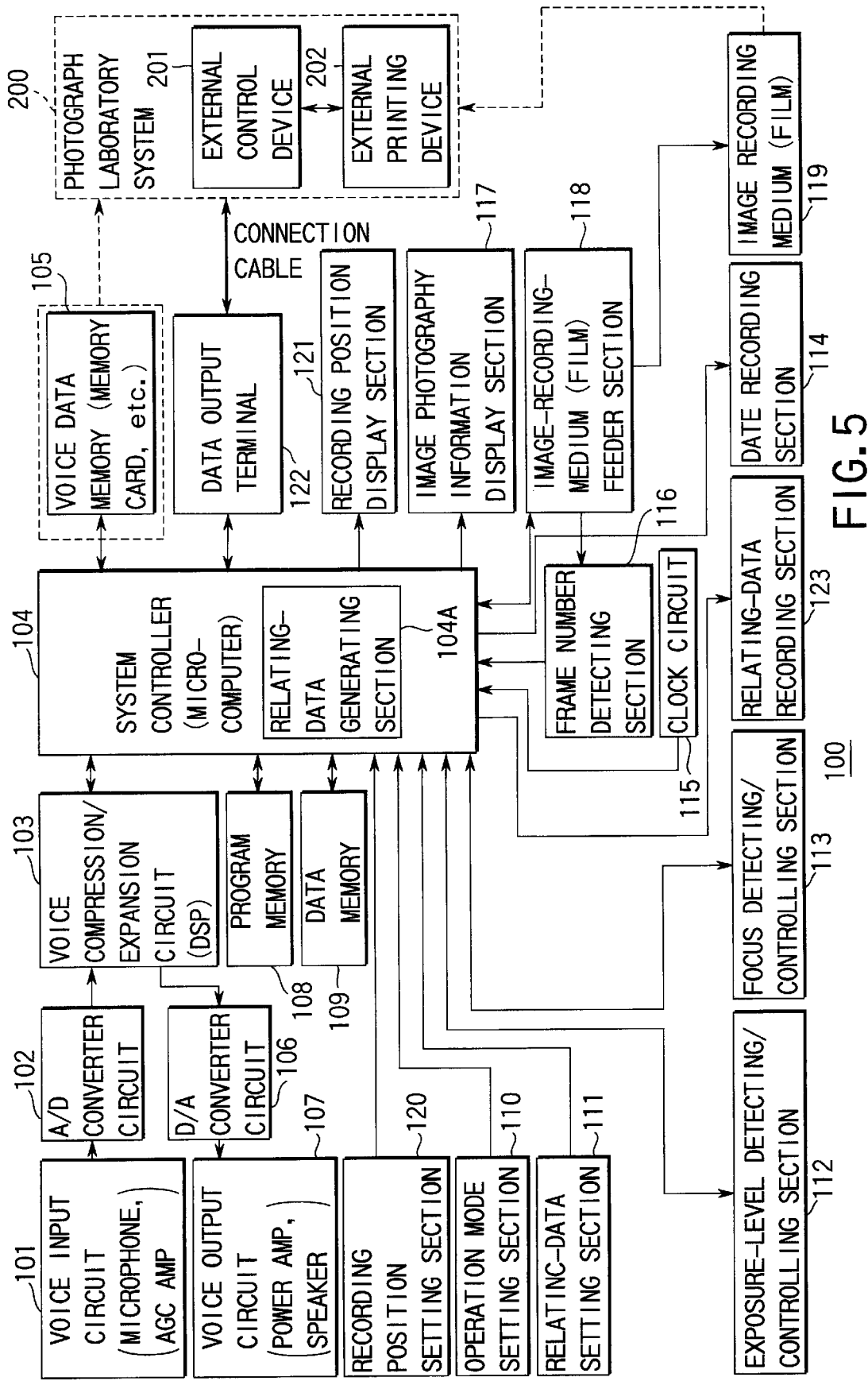
FIG. 5 is a view illustrating the structure of a silver film camera to which a photography device according to a first embodiment of the invention is applied.

FIG. 5 shows the structure of a silver film camera 100 to which a photography device according to a first embodiment of the invention is applied.

An analog signal is input through a voice input circuit 101 (corresponding to the voice input section 10) including a microphone and an auto gain control (AGC) amplifier, then subjected to known signal processing, and converted into a digital signal by an A/D converter circuit 102 corresponding to the digital conversion section 11. The resultant digital signal is input to a voice compression/expansion circuit 103 constituted of a digital signal processor (DSP) and corresponding to the voice compression section 12, where the signal is subjected to voice compression processing. The compressed digital voice data is read by a system controller 104 constituted of a microcomputer and corresponding to the system controller 17, and is written into a voice data memory 105 corresponding to the voice data memory 13A.

The voice data memory 105 may be of a fixed type or of a detachable type such as a memory card. In FIG. 5, the case of using the detachable type memory is indicated by the broken lines.

This embodiment employs means for reproducing the contents of digital voice data stored in the voice data memory 105 to enable the user to confirm them. When executing reproduction and confirmation, the system controller 104 accesses the voice data memory 105, thereby reading digital voice data stored therein, executing expansion processing using the voice compression/expansion circuit 103, and returning the resultant data to a voice signal using a D/A converter circuit 106. After that, a voice output circuit 107 which corresponds to part of the output section 16 amplifies the signal using, for example, a power amplifier, and outputs a reproduced sound, using a speaker or an earphone for converting an electric signal to a sound pressure.

The system controller 104 is connected to a program memory 108 that stores operation programs for the system controller 104, and also to a data memory 109 to be used when executing various processes.

The system controller 104 is further connected to an operation mode setting section 110 and a relating-data setting section 111.

The operation mode setting section 110 is formed of switches to be used by the user to designate various operation modes. The operation modes include, for example, a voice code recording mode for recording the voice code image 21, a priority mode for determining which of an input period, voice quality, etc. should have priority when recording a voice as the voice code image 21, a setting mode for setting whether the setting of relating data should be executed manually or automatically, and an output mode for setting whether, for example, voice data or relating data stored in the voice data memory 105 should be output. In other words, the operation mode setting section 110 corresponds to the mode setting section 20.

The relating-data setting section 111 is formed of, for example, switches to be used for inputting the relating data and information such as comments on the relating data. Where, for example, the operation mode setting section 110 sets a mode for manually setting the relating data, the relating-data setting section 111 sets a frame number as the relating data to be made to correspond to voice data when the voice data is stored in the voice data memory 105. When such setting has been executed using a switch, the system controller 104 causes the relating-data generating section 104A (corresponding to the relating-data generating section 14) to create relating data corresponding to the input frame number, and to store it in the voice data memory 105 in relation to the voice data.

The system controller 104 is connected to an exposure-level detecting/controlling section 112, a focus detecting/controlling section 113, a date recording section 114, a clock circuit 115, a frame number detecting section 116, an image photography information display section 117 and an image-recording-medium feeding section 118. These sections are similar to those employed in an already known silver film camera. The image photography information display section 117 corresponds to part of the display section 16A, and the other sections correspond to the photographing section 15.

The exposure-level detecting/controlling section 112 executes an AE operation, while the focus detecting/controlling section 113 executes an AF operation. In accordance with the results of the AE and AF operations, the system controller 104 causes the image photography information display section 117 such as a finder to display a warning message concerning exposure or a message concerning focusing. Further, the controller 104 reads date information from the clock circuit 115, and causes the date recording section 114 to print the date on a film as the image recording medium 119. Each time an photographing operation is executed, the image recording medium feeding section 118 winds the film, and the frame number detecting section 116 increases the number of frames by "1" in accordance with the winding operation.

Where the operation mode setting section 110 sets a mode in which the relating data is automatically set, the relating-data generating section 104A sets, as the relating data, the frame number detected by the frame number detecting section 116, and stores it in the voice data memory 105. The frame number detecting section 116 may be provided in the system controller 104.

The system controller 104 is connected to a recording position setting section 120 and a recording position display section 121 corresponding to part of the display section 16A. The recording position setting section 120 consists of switches for enabling the user to designate the positions of the voice code image 21 and the relating-data recording section 25 in the printing medium 23. The recording position display section 121 displays these positions to enable the user to confirm them.

The system controller 104 is also connected to a data output terminal 122 corresponding to part of the output section 16.

In the silver film camera 100, it is necessary to transmit image information recorded in a film as the image recording medium 119, and voice data stored in the voice data memory 105 to a photograph laboratory system 200, in order to subject the voice code image 21 and the photographed still image 22 to processing for actually recording them on the printing medium 23. To this end, the system controller 104 reads the voice data, the relating data and information associated therewith from the voice data memory 105, and transmits them to the photograph laboratory system 200 through the data output terminal 122 via, for example, a connection cable. The image recording medium (film) 119 is physically brought into the photograph laboratory system 200, as in the conventional case.

In the case where the voice data memory 105 is of the fixed type, it is necessary to bring the camera itself into the photograph laboratory system 200. However, in the case where the memory 105 is formed of, for example, a detachable memory card, it suffices if the voice data memory 105 and the film are brought together into the photograph laboratory system 200.

Thus, a pair of vice data and relating data are brought into the photograph laboratory system 200. In the system 200, an external control device 201 detects the data to create the voice code image 21, and an external printing device 202 prints it on a printing medium together with the frame numbers of the film.

The silver film camera 100 may have a relating-data recording section 123. In the above explanation, the voice code image 21 and the relating data are printed on a photographic paper sheet as the printing medium 23. The relating data, however, can be printed directly on a film as the image recording medium 119. For example, by using an exposure system for optically focusing a dot matrix liquid crystal panel with a back-light, as in the date recording section 114, relating data and information associated therewith is directly exposed on the image recording medium (film) 119. In this case, in order to secure an area for recording the voice code image 21, this area may be exposed in white.

Relating data generated by the relating-data generating section 104A is temporarily stored in the data memory 109. When recording the relating data on a film, the relating-data recording section 123 reads and records the memory contents temporarily stored in the data memory 109. The relating data temporarily stored in the data memory 109 is finally stored in the voice data memory 105 in relation to voice data.

Figure 6A:
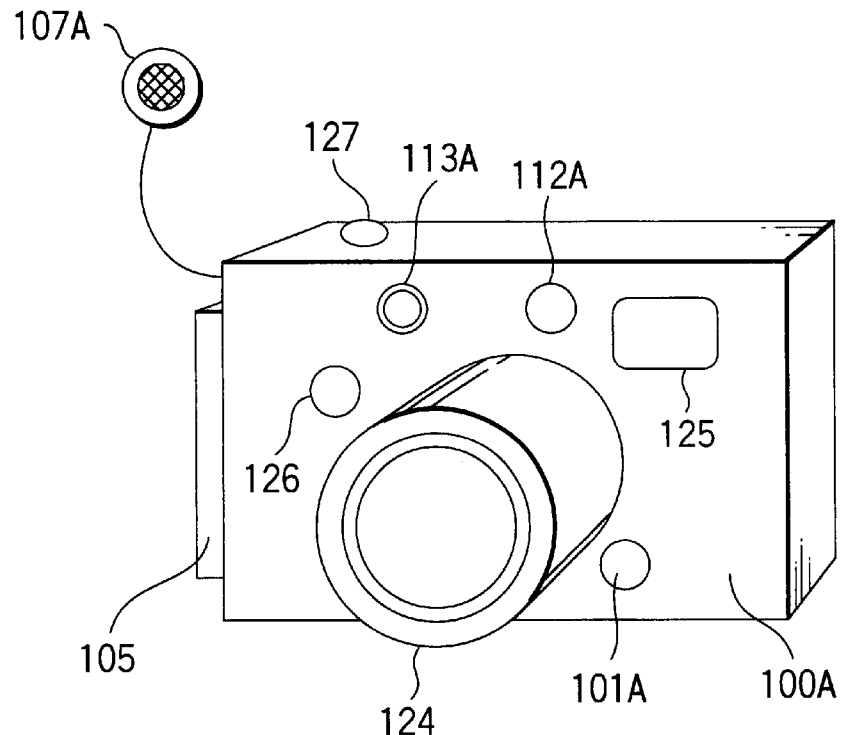
FIG. 6A is a view showing the outward appearance of a front section of the silver film camera of the first embodiment.
Figure 6B:
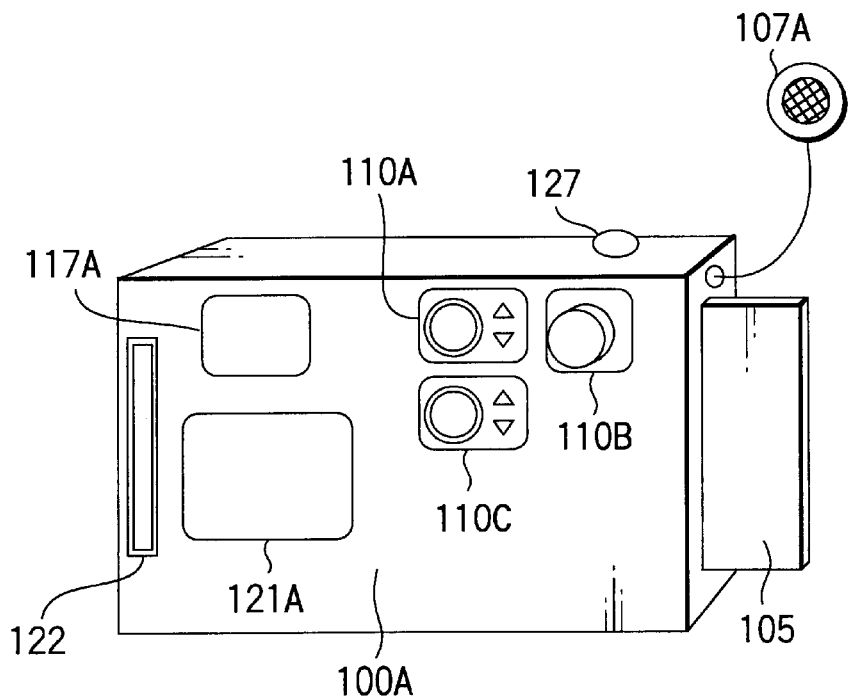
FIG. 6B is a view showing the outward appearance of a rear section of the silver film camera of the first embodiment.

Referring to FIGS. 6A and 6B, the outward appearance of the silver film camera 100 will be described.

As is shown in FIG. 6A, a lens 124, a finder 125, an exposure level detecting section 112A, a focus detecting section 113A and a self-timer lamp 126, etc. are provided on the front surface of a camera body 100A, as in conventional cameras. A photography start button 127 is provided on the upper surface of the body 100A.

Further, the present invention is characterized in that a microphone 101A for inputting a voice is provided on the front surface of the camera body 100A, and that a voice data memory (if the memory is of a detachable type, it is formed of a memory card) 105 for storing voice data and a voice confirming earphone 107A are provided on a side surface of the body 100A. The self-timer lamp 126 also serves as a lamp for displaying a recording period. The recording period is optionally set using the operation mode setting section 110, or automatically determined in accordance with the set length of a recorded voice code image.

Although the microphone 101A is provided on the front surface of the camera body 100A, i.e. on the lens side, it is a matter of course that the microphone may be located on the rear surface. In the case of locating the microphone on the lens side, the voice of a to-be-photographed person can be recorded, while in the case of locating it on the rear surface, the photographer can record their comments. If the microphone is of an omnidirection type, the same effect will be obtained irrespective of whether the microphone is located on the front surface or on the rear surface.

As shown in FIG. 6B, the rear surface of the camera body 100A is provided with the data output terminal 122, an information display liquid crystal panel 121A as the recording position display section 121, various buttons as the operation mode setting section 110, as well as a usual finder 17A. The buttons include an operation mode setting button 110A, a voice code recording mode setting button 110B and a parameter setting button 10C. The voice code recording mode setting button 110B is constructed as a push switch whose projecting state and retreat state are alternately locked each time the button is pushed (ON). Accordingly, the photographer can recognize, only from the state of the button 110B, whether the present mode is the voice code recording mode or not, even if the present mode is not displayed on the information display liquid crystal panel 121A.

Figure 7:
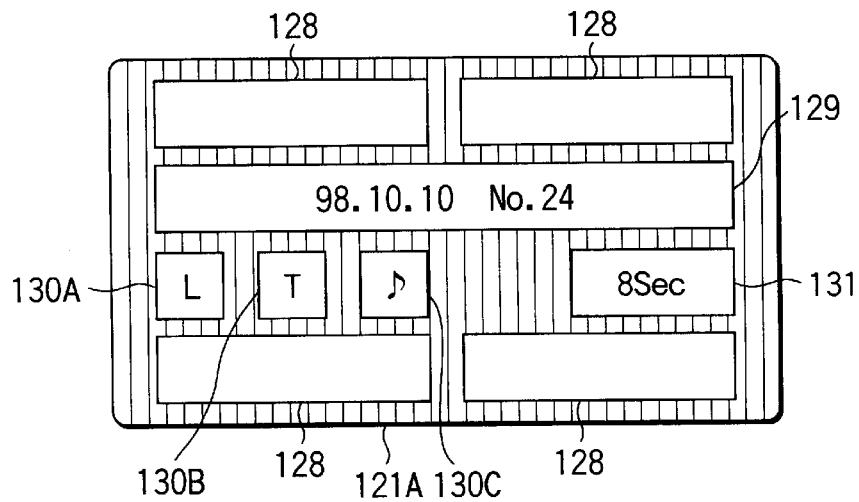
FIG. 7 is a view showing an information display liquid crystal panel.

As shown in FIG. 7, the information display liquid crystal panel 121A comprises four recording position display sections 128 for displaying recording positions of the voice code image 21, a relating-data contents display section 129 for displaying relating data and information associated therewith, three priority-mode-selected-state display sections 130A–130C and a recordable period display section 131.

Figure 1:
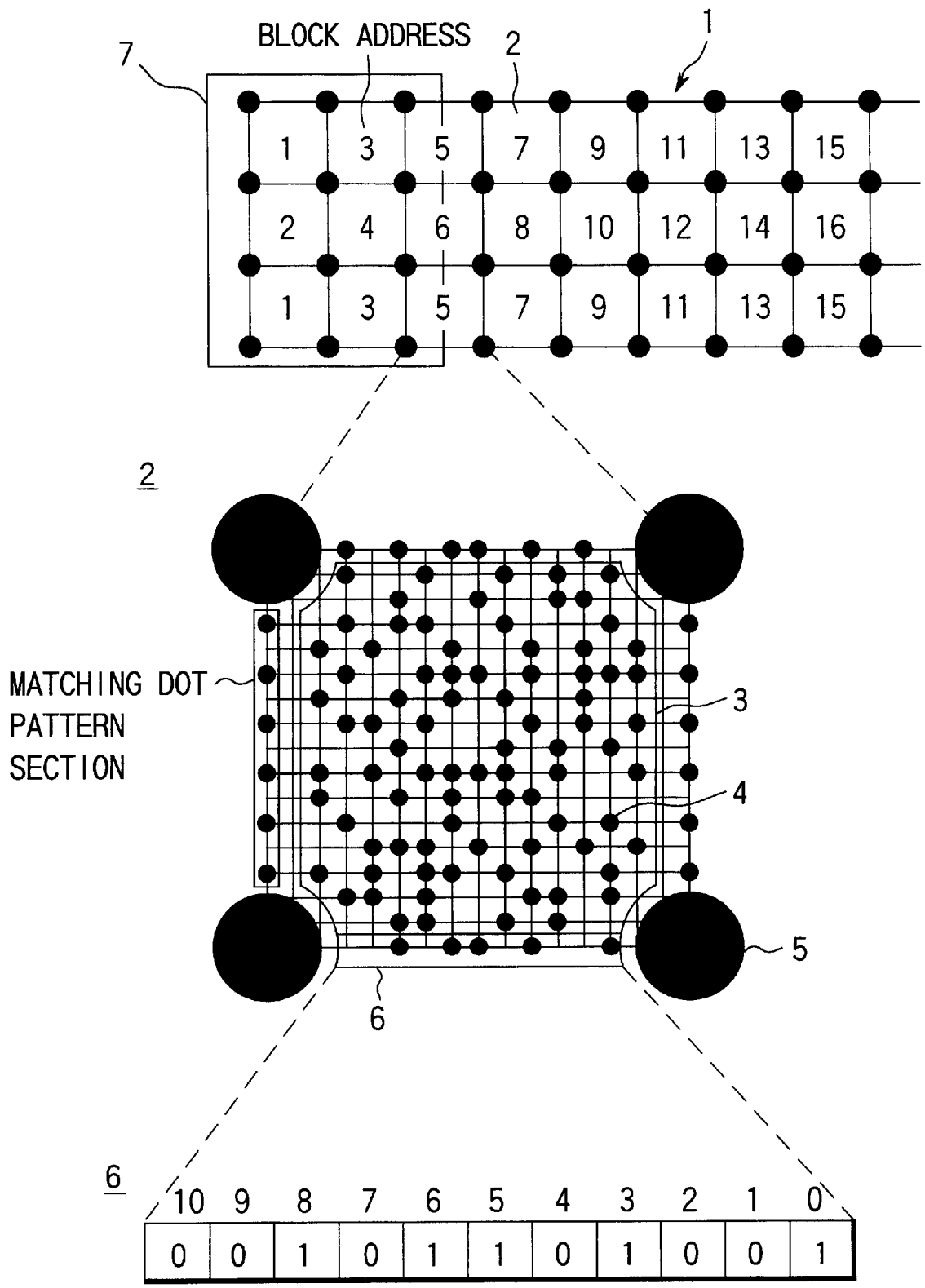
FIG. 1 is a view illustrating a format of a dot code as a voice code image.

The recording position display sections 128 indicate positions where the voice code image 21 can be recorded. The photographer can optionally designate one or more of the positions, using the recording position setting section 120. The designated position is lit to indicate the recording position of the image 21. The setting of the recording position is executed by, for example, operating the operation mode setting button 110A to enter the setting mode, and further operating the button 110A in the setting mode. Alternatively, the setting may be executed using an exclusive button. When recording a large amount of voice data, it is considered to record the voice code image 21 in a long lower portion of the printing medium 23. In this case, in the information display liquid crystal panel 121A, both the lower right and left display sections 128 are lit in response to designation of the lower portion. Further, if the voice code image 21 is in the form of a dot code of a dividable block address system as shown in FIG. 1, original voice data can be reproduced by reading all data, even when the data is divided into upper and lower portions. Therefore, in this case, it is possible that the upper and lower portions will be designated to light the upper two display sections and the lower two display sections.

The relating-data contents display section 129 displays relating data ("No 24" as a frame number in FIG. 7) set by the relating-data setting section 111 (for the setting, an exclusive button may be used, or alternatively, menu selection may be executed using the operation mode setting button 110A) or set automatically. The section 129 also displays information associated with the relating data (date information "98.9.10" and comments "MT. FUJI").

The priority-mode-selected-state display sections include a "length (layout)" priority-mode-selected-state display section 130A, a "time" priority-mode-selected-state display section 130B and a "voice quality" priority-mode-selected-state display section 130C. The "length" priority-mode-selected-state display section 130A is lit when a length priority mode, in which the recording position of the voice code image 21 has priority, is set by the mode setting button 110A. Similarly, the "time" priority-mode-selected-state display section 130B is lit when a time priority mode, in which the recording period required for a voice to be converted into the voice code image 21 has priority, is set by the mode setting button 110A. The "voice quality" priority-mode-selected-state display section 130C is lit when a voice quality priority mode, in which the quality of a voice to be converted into the voice code image 21 has priority, is set by the mode setting button 110A.

Since the three priority-mode-selected-state display sections 130A–130C indicate which component of the voice data should have priority, these three sections are not simultaneously lit, but only one of them is lit. A state in which one of the three priority-mode-selected-state display sections is lit is a first mode that enables the above-described predetermined operation necessary for recording the voice code image 21 on the printing medium 23. On the other hand, a state in which all the priority-mode-selected-state display sections are off is a second mode that disables the above-described predetermined operation necessary for recording the voice code image 21 on the printing medium 23.

Where only two of the three priority modes can be set, a state in which one of two priority-mode-selected-state display sections is lit is the first mode, and a state in which both of the two priority-mode-selected-state display sections are off is the second mode.

The recordable period display section 131 displays a recordable period which is optionally set, using the operation mode setting button 110A, or determined in accordance with a set priority mode.

Figure 8:
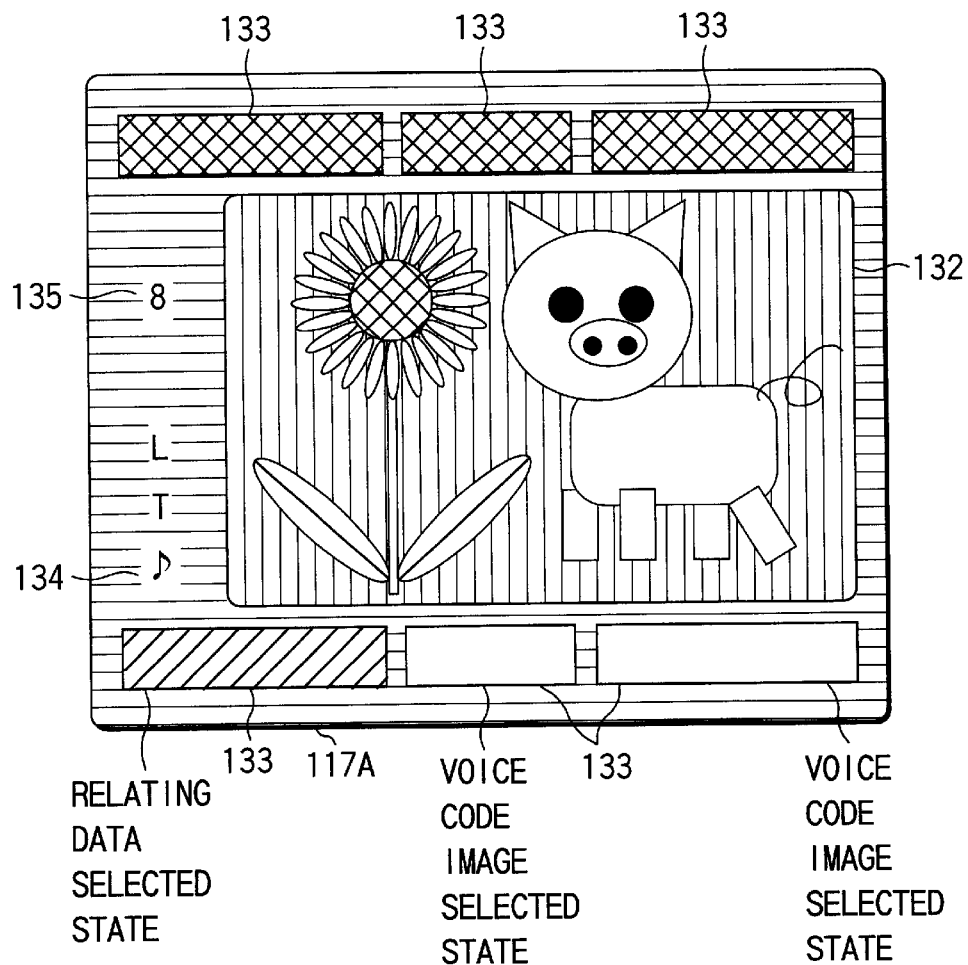
FIG. 8 is a view showing a display in a finder.

The finder 117A is an optical finder. As shown in FIG. 8, in the finder, six LEDs 133 for displaying the recording positions of voice code image-relating data are arranged, three above and three below an optical image display section 132 for observing a to-be-photographed subject obtained via an optical system (not shown). A code-recording-mode-selected state display section 134 and a recordable period display section 135 are provided at the left side of the image display section 132.

The LEDs 133 each can display both the recording positions of the voice code image 21 and the relating data recording section 25. Whether the image 21 or the relating data is recorded can be determined from the color or the brightness of the light of each LED. For example, in FIG. 8, that no voice code image or relating data will be recorded in an upper portion is indicated by turning off the upper three LEDs. On the other hand, that the voice code image 21 will be recorded in lower middle and right portions is indicated by lighting the lower middle and right LEDs 133 in a first color. Furthermore, that relating data will be recorded is indicated by lighting the lower left LED 133 in a second color, or by lighting the LED in the first color but more weakly.

The code-recording-mode-selected state display section 134 includes a mark "L" to be lit when the length priority mode is set, a mark "T" to be lit when the time priority mode is set, and a mark ♪ to be lit when the voice quality priority mode is set. Lighting of these marks are controlled in a similar manner to the three priority-mode-selected-state display sections 130A–130C on the information display liquid crystal panel 121A. The recordable period display section 135 displays a recordable time period as in the recordable period display section 131 on the information display liquid crystal panel 121A.

Since the finder 117A has a small area, the contents of the relating data are not displayed in this embodiment. However, it is a matter of course that they may be displayed.

Figure 9:
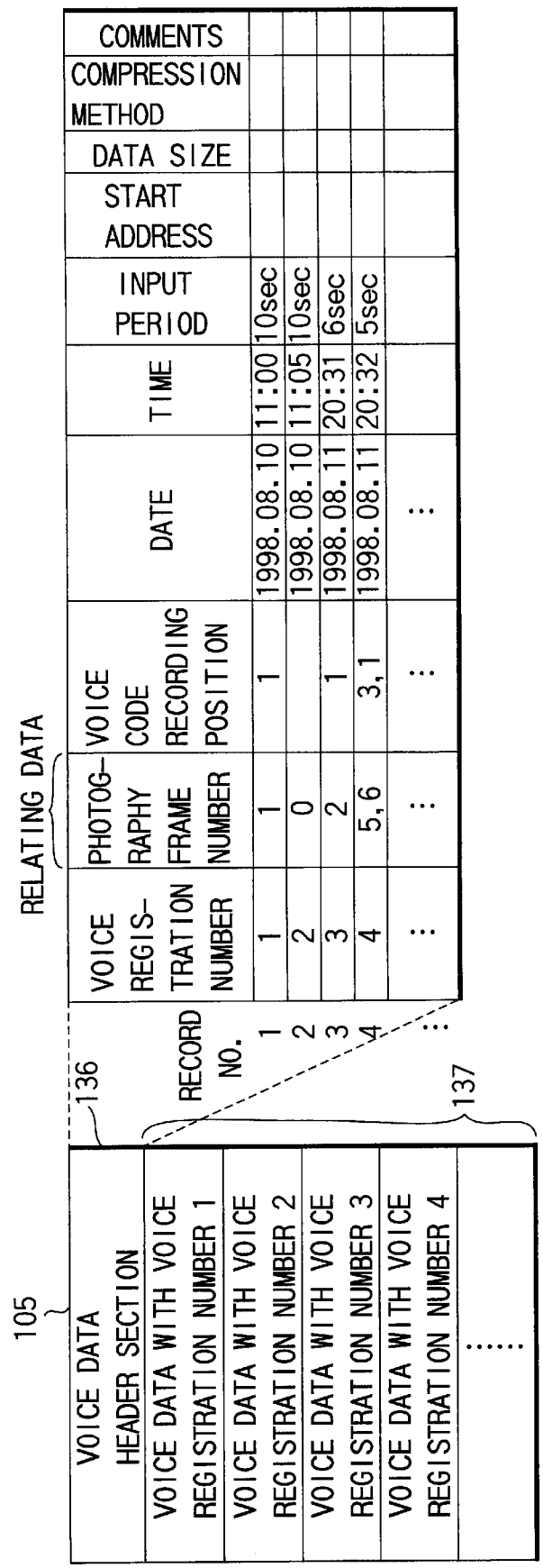
FIG. 9 is a storage format used in a voice data memory.

Referring then to FIG. 9, a storage format used in the voice data memory 105 will be described.

The voice data memory 105 mainly comprises a voice data header section 136 and a voice data storage section 137. The voice data storage section 137 stores each voice data item input through the microphone 101A, while the voice data header section 136 stores registration information concerning each of input voice data items.

Specifically, the voice data header section 136 stores, as one record for each voice data item, a voice registration number, a photography frame number, a voice code recording position, a date, a time, an input time period, a start address, a data size, a compression method, comments, etc.

The voice registration number is provided for identifying each voice data item. Although this number is expressed by a numeral, but it is not limited thereto. The frame number corresponds to the relating data. Frame number "0" indicates that there is no relating data, and frame number "5, 6" indicates that a single voice code image stretches over a plurality of images. The voice code recording position indicates, using a numeral (numerals), the portion(s) of a recording medium on which each voice code image is printed.

Figure 10:
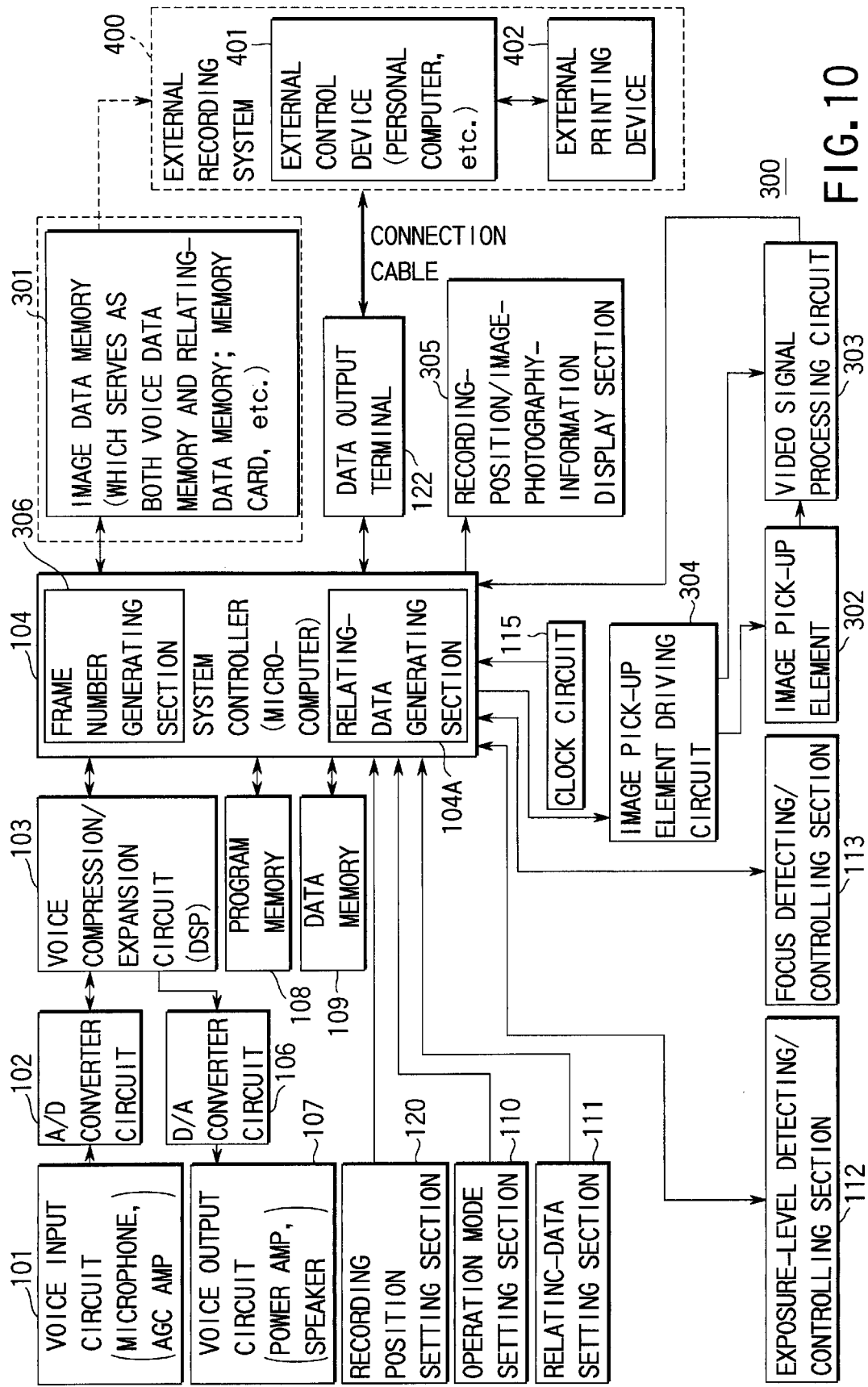
FIG. 10 is a block diagram illustrating an electronic still camera to which the photography device of the first embodiment is applied.

FIG. 10 shows a structure in which the photography device according to the first embodiment is applied to an electronic still camera 300. In the figure, similar elements to those of the silver film camera 100 shown in FIG. 5 are designated by corresponding reference numerals, and hence a detailed description will not be given thereof but only of different elements.

The electronic still camera 300 inherently incorporates an image data memory 301 for storing a photographed image. Accordingly, it is not necessary to employ any particular memory like the voice data memory 13A for storing voice data, relating data and information associated therewith. The image data memory 301 also functions as the voice data memory 13A. Of course, the image data memory 301 may be of the fixed type or the detachable type.

Further, since the electronic still camera 300 does not use a film, it does not have a photographing mechanism for the film and a film feeding mechanism. Instead, it has an image pick-up element 302 for picking up image data, a video signal processing circuit 303 for converting a video signal output from the image pick-up element 302, into color and brightness signals or an RGB signal, thereby supplying the system controller 104 with the signal as a digital image signal, and an image pick-up element driving circuit 304 for driving the image pick-up element 302.

The camera 300 also has a recording-position/image-photography-information display section 305 consisting of a single large view finder, instead of the image photography information display section 117 (the finder 117A) and the recording position display section 121 (the information display liquid crystal panel 121A). However, it is a matter of course that the camera 300 may incorporate the image photography information display section 117 (the finder 117A) and the recording position display section 121 (the information display liquid crystal panel 121A), as in the silver film camera 100.

Further, in the electronic still camera, the system controller 104 includes a frame number creating section 306 for creating a photography frame number used as relating data. The section 306 creates a frame number in accordance with each photographing operation of the image pick-up element 302.

Since the electronic still camera 300 is usually used personally, a domestic external recording system 400 is used for printing image information and voice code images. This domestic external recording system 400 consists of an external printing device 402 which is, for example, a printer connected to an external control device 401 such as a personal computer, or which is a dedicated printer that can be directly connected to the image data memory 301. However, the number of digital image laboratories is increasing these days, and therefore image information and voice code images created by the electronic still camera 300 may be printed in such laboratories as in the aforementioned case.

FIG. 11 shows a storage format used in the image data memory 301. The image data memory 301 mainly comprises a voice data header section 307, a voice data storage section 308, an image data header section 309 and an image data storage section 310. The voice data header section 307 and the voice data storage section 308 are similar to the voice data header section 136 and the voice data storage section 137 of the voice data memory 105 shown in FIG. 9, respectively.

The image data header section 309 stores, as one record for each image data item, a photography frame number, a date, a time, a resolution, a color, a start address, a data size, a compression method, etc. The photography frame number relates image data to voice data.

The operations of the silver film cameral 100 and the electronic still camera 300 will be described with reference to the flowchart, which illustrates an operation program stored in the program memory 108 and to be executed by the system controller 104.

Figure 12:
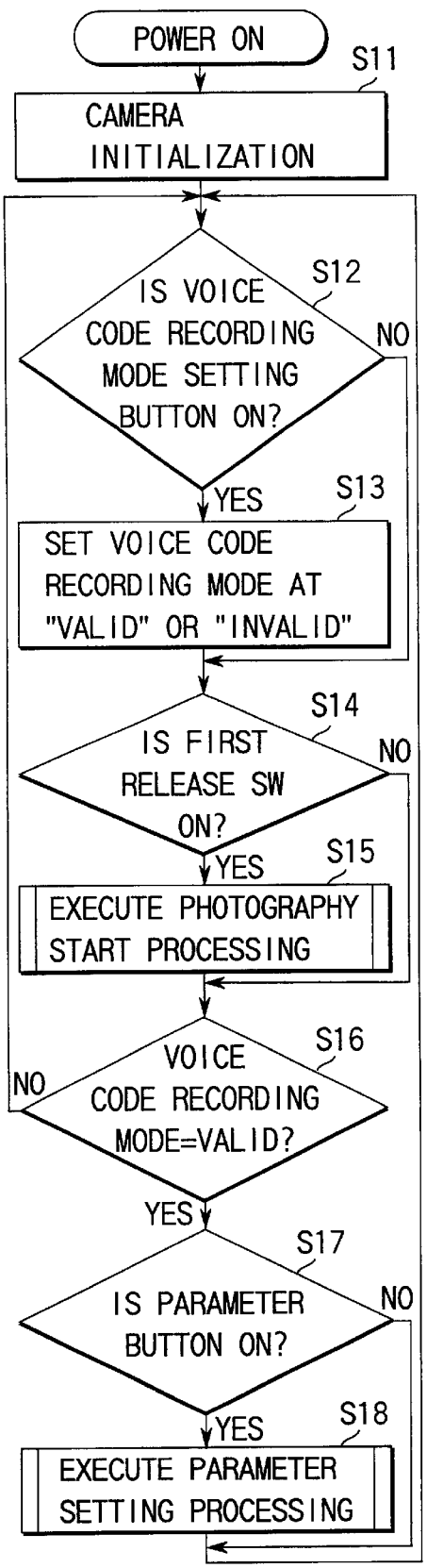
FIG. 12 is a main flowchart useful in explaining the operation of the camera of the first embodiment, which is executed when a priority mode is fixed.

FIG. 12 is a main flowchart useful in explaining the operation of a camera in which a priority mode is fixed, i.e. one of three parameters, i.e. a voice code recording position, a voice input period and voice quality, is predetermined to be variable.

Upon turning on the power, the camera is initialized (step S11). After that, it is determined whether or not the voice code recording mode setting button 110B has been turned on (step S12). If the button is not turned on, the program proceeds to a step S14. On the other hand, if the voice code recording mode setting button 110B is turned on, the voice code recording mode is set "valid" or "invalid" (step S13). In other words, each time the voice code recording mode setting button 110B is turned on, "valid" or "invalid" is established.

Then, it is determined whether or not the first switch (SW) (so-called first release SW) of the photography start button 127 has been turned on (step S14). If it is not turned on, the program proceeds to a step S16. If, on the other hand, the first release SW is turned on, photography start processing, which will be described later in detail, is executed (step S15).

Subsequently, it is determined whether the voice code recording mode is "valid" or "invalid" (step S16). If the voice code recording mode is determined to be "invalid", the program returns to the step S12.

If, on the other hand, the voice code recording mode is determined to be "valid", it is further determined whether or not the parameter setting button 110C is turned on (step S17). If the button 110C is not turned on, the program returns to the step S12, whereas if the button 110C is turned on, parameter setting processing, which will be described later in detail, is executed (step S18), followed by the program returning to the step S12.

Figure 13:
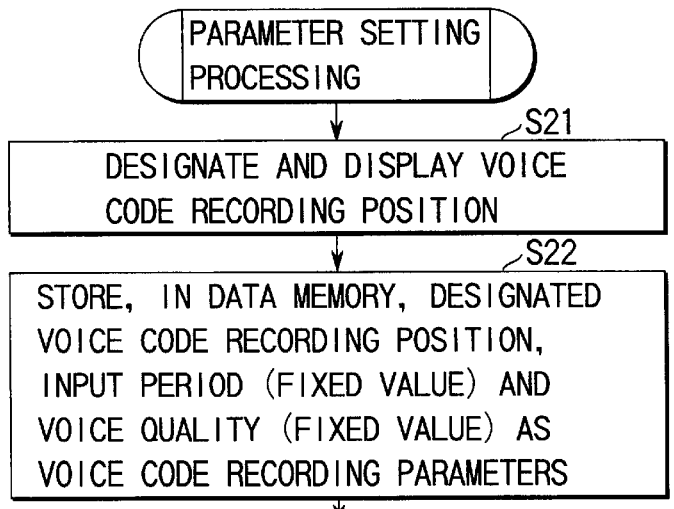
FIG. 13 is a flowchart for explaining parameter setting processing shown in FIG. 12, which is executed when a voice code recording position has priority.

FIG. 13 is a flowchart illustrating the parameter setting processing to be executed at the step S18 when the voice input period and the voice quality are fixed. In this case, first, a voice code recording position as a variable parameter is designated, and the designated position is displayed on the information display liquid crystal panel 121A and the finder 117A (step S21). After that, the designated voice code recording position and the fixed voice input period and voice quality are stored as voice code recording parameters in the data memory 109 (step S22). The parameter setting processing is then finished, and the program returns to the main routine shown in FIG. 12.

Figure 14:
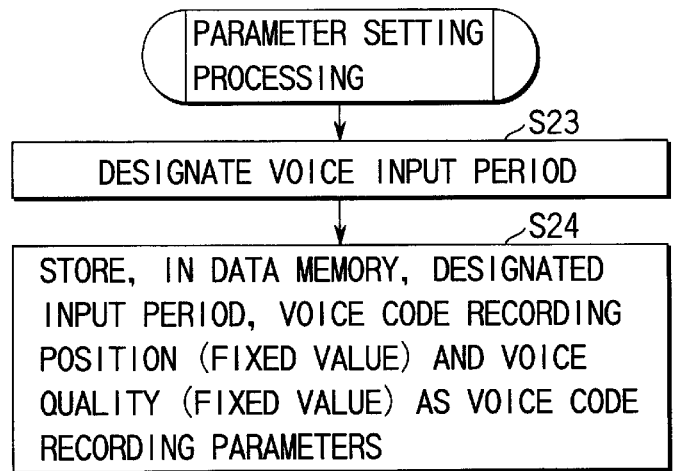
FIG. 14 is a flowchart for explaining parameter setting processing shown in FIG. 12, which is executed when a voice input period has priority.

FIG. 14 is a flowchart illustrating the parameter setting processing to be executed at the step S18 when the voice code recording position and the voice quality are fixed. In this case, first, a voice input period as a variable parameter is designated, and a position corresponding to the designated input period is displayed on the information display liquid crystal panel 121A and the finder 117A (step S23). After that, the designated voice input period and the fixed voice code recording position and voice quality are stored as voice code recording parameters in the data memory 109 (step S24). The parameter setting processing is then finished, and the program returns to the main routine shown in FIG. 12.

Figure 15:
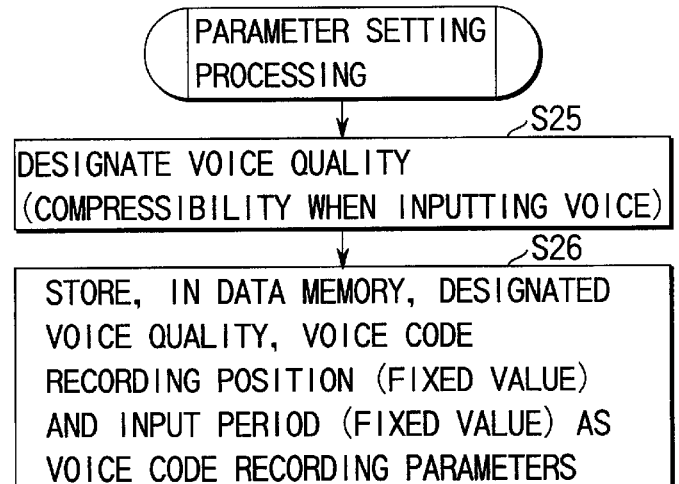
FIG. 15 is a flowchart for explaining parameter setting processing shown in FIG. 12, which is executed when voice quality has priority.

FIG. 15 is a flowchart illustrating the parameter setting processing to be executed at the step S18 when the voice code recording position and the voice input period are fixed. In this case, first, voice quality as a variable parameter, i.e. compressibility at the time of voice input, is designated, and a position corresponding to the designated voice quality is displayed on the information display liquid crystal panel 121A and the finder 117A (step S25). After that, the designated voice quality and the fixed voice code recording position and voice input period are stored as voice code recording parameters in the data memory 109 (step S26). The parameter setting processing is then finished, and the program returns to the main routine shown in FIG. 12.

Figure 16:
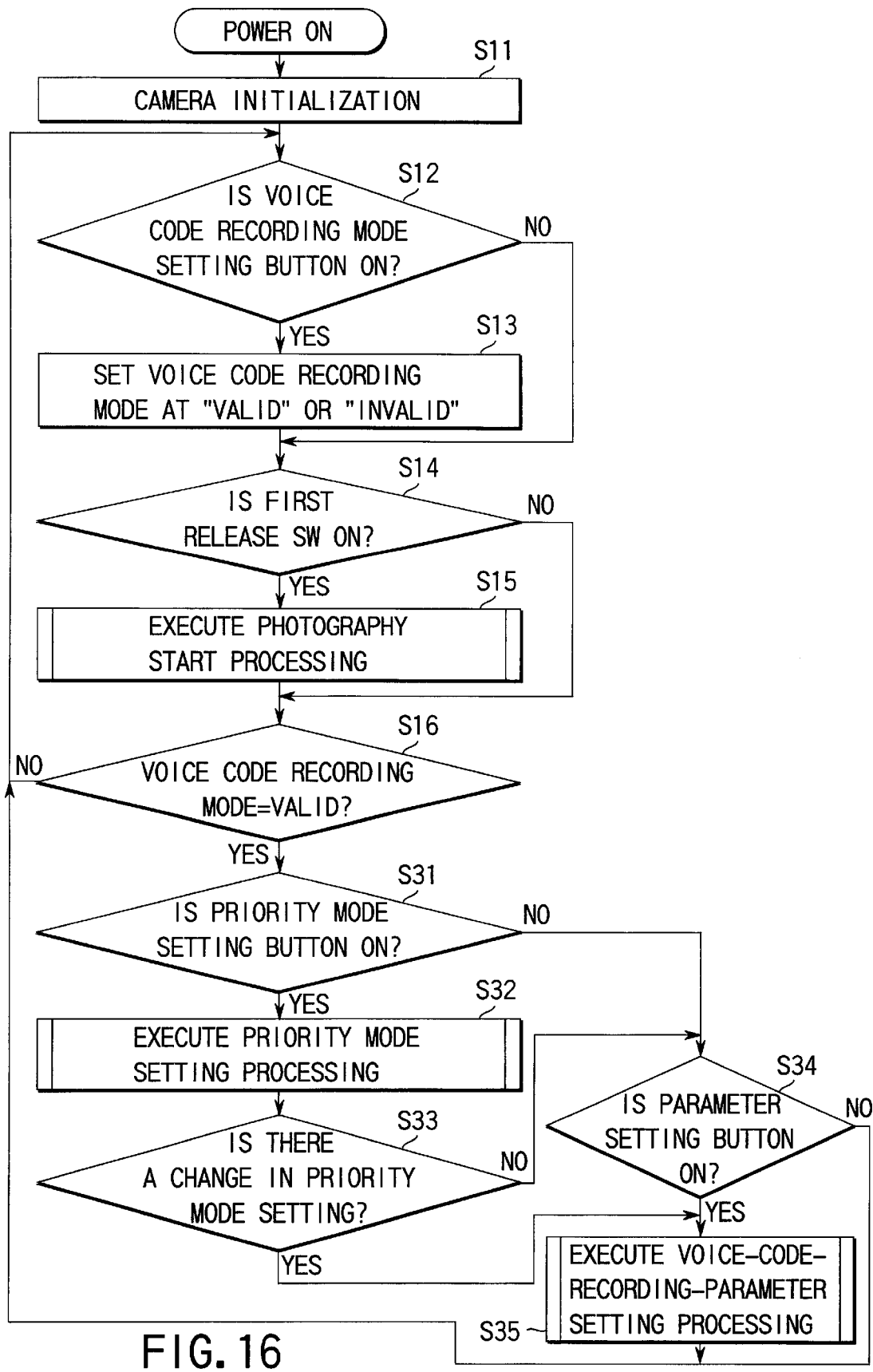
FIG. 16 is a main flowchart for explaining the operation of a camera which enables the photographer to select a priority mode.

In the case of a camera in which the user can select a priority mode, the main flowchart is as shown in FIG. 16. Since the steps S11–S16 are similar to those shown in FIG. 12, no detailed description will be given thereof.

If it is determined at the step S16 that the voice code recording mode is "valid", it is determined whether or not a priority mode button (an exclusive priority button may be used) is in the ON state (or alternatively, menu selection may be executed, using the operation mode setting button 110A) (step S31). If the priority mode button is determined not to be in the ON state, the program proceeds to a step S34. On the other hand, if the priority mode button is determined to be in the ON state, priority mode setting processing, which will be described later in detail, is executed (step S32). After that, it is determined whether or not the priority mode has been changed in the priority mode setting processing (step S33). If there is no change, the program proceeds to the step S34, whereas if there is a change, the program proceeds to a step S35.

It is determined at the step S31 that the priority mode setting button is not in the ON state, or if it is determined at the step S33 that there is no change in priority mode setting, it is further determined whether or not the parameter setting button 110C is in the ON state (step S34). If the button 110C is not in the ON state, the program returns to the step S12, whereas if the button 110C is in the ON state, the program returns to the step S12 after executing voice-code-recording-parameter setting processing at a step S35, which will be described later in detail.

Figure 17:
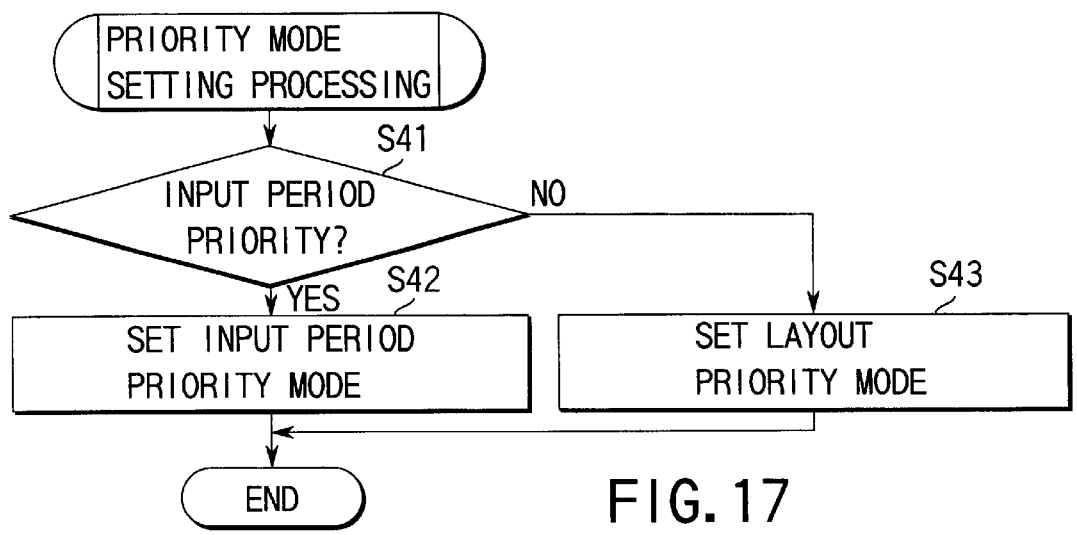
FIG. 17 is a flowchart useful in explaining priority mode setting processing shown in FIG. 16, which is executed when the voice quality is fixed.
Figure 18:
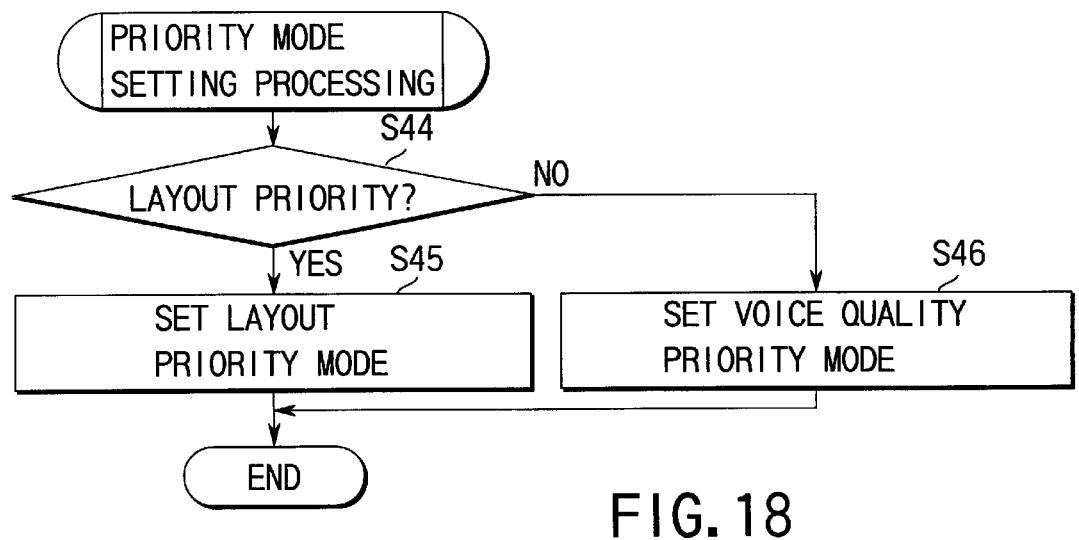
FIG. 18 is a flowchart useful in explaining is priority mode setting processing shown in FIG. 16, which is executed when the input period is fixed.
Figure 19:
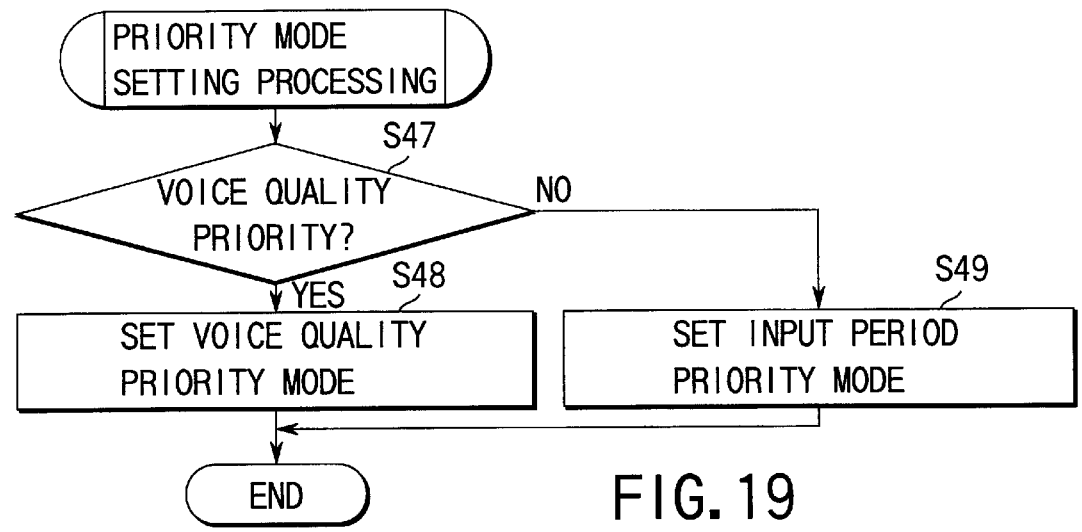
FIG. 19 is a flowchart useful in explaining priority mode setting processing shown in FIG. 16, which is executed when layout is fixed.

FIGS. 17–19 are flowcharts each illustrating the priority mode setting processing executed at the step S32. Each of these flowcharts illustrates a case where a corresponding one of the three parameters is fixed, and one of the remaining two parameters is selected.

Where the voice quality is fixed, first, it is determined whether or not the input period is designated to have priority (step S41), as is shown in FIG. 17. If the input period priority is designated, the input period priority mode is set (step S42). If, on the other hand, the input period priority is not designated, the layout priority mode is set (step S43). The priority mode setting processing is then finished, and the program returns to the main routine shown in FIG. 16.

Where the input period is fixed, first, it is determined whether or not the layout is designated to have priority (step S44), as is shown in FIG. 18. If the layout priority is designated, the layout priority mode is set (step S45). If, on the other hand, the layout priority is not designated, the voice quality priority mode is set (step S46). The priority mode setting processing is then finished, and the program returns to the main routine shown in FIG. 16.

Where the layout is fixed, first, it is determined whether or not the voice quality is designated to have priority (step S47), as is shown in FIG. 19. If the voice quality priority is designated, the voice quality priority mode is set (step S48). If, on the other hand, the voice quality priority is not designated, the input period priority mode is set (step S49). The priority mode setting processing is then finished, and the program returns to the main routine shown in FIG. 16.

Figures 22, 23:
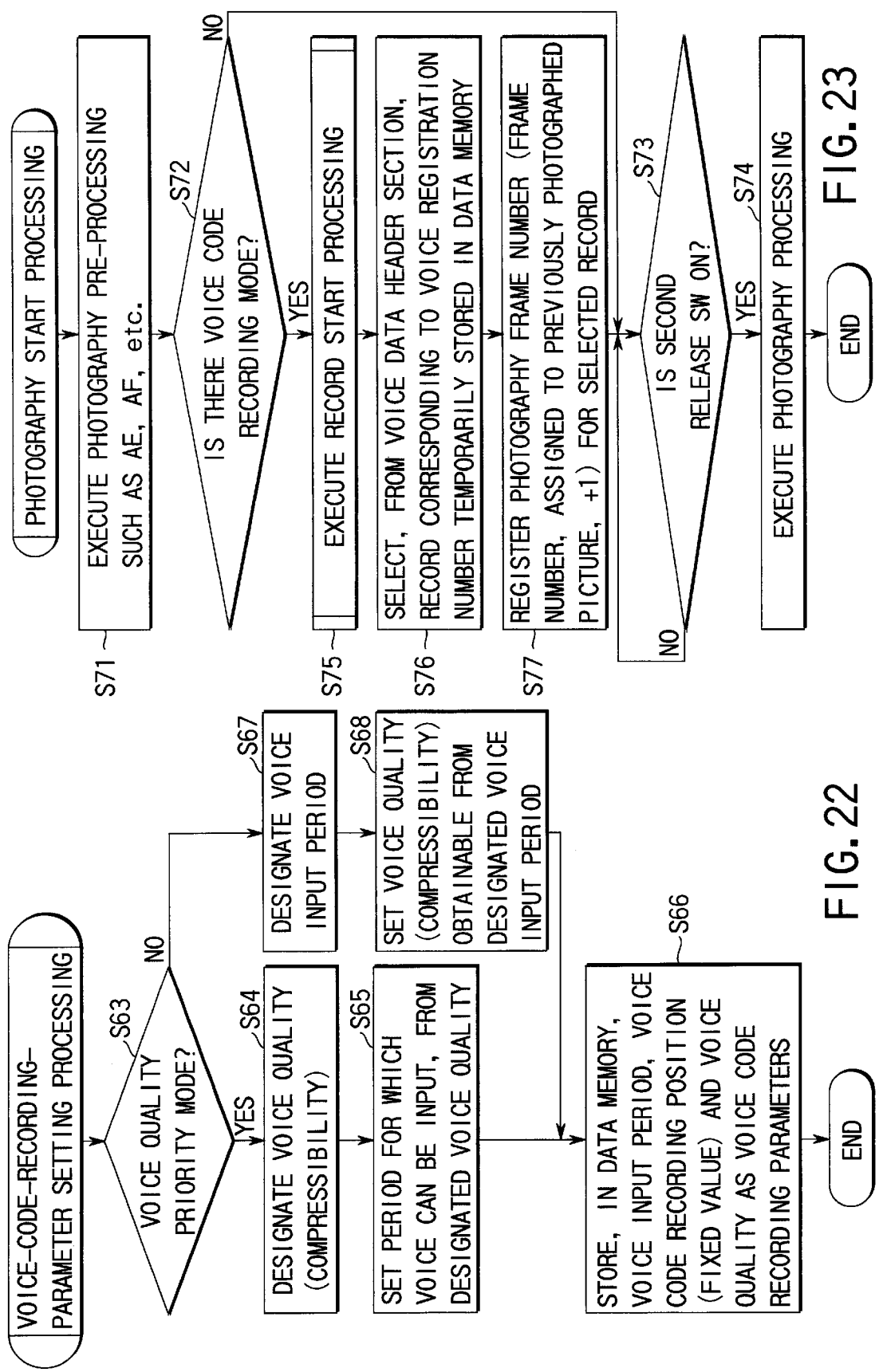
FIG. 22 is a flowchart useful in explaining voice-code-recording-parameter setting processing shown in FIG. 16, which is executed when the layout is fixed.
FIG. 23 is a flowchart useful in explaining photography start processing shown in FIGS. 12 and 16, which is executed in the case of a silver film camera.

FIGS. 20–22 are flowcharts each illustrating the voice-code-recording-parameter setting processing executed at the step S35.

Where the voice quality is fixed, first, it is determined whether or not the present priority mode is the input period priority mode (step S51), as is shown in FIG. 20. If the input period priority mode is set, a voice input period is designated using, for example, the operation mode setting button 110A (step S52), thereby setting a voice code recordable position based on the designated voice input period (step S53). After that, the designated voice input period, the set voice code recording position, and voice quality as a fixed value are stored as voice code recording parameters in the data memory 109 (step S54). The voice-code-recording-parameter setting processing is then finished, and the program returns to the main routine shown in FIG. 16.

If, on the other hand, it is determined at the step S51 that the present priority mode is not the input period priority mode, a voice code recording position is designated using, for example, the operation mode setting button 110A (step S55), and a period for which voice can be input is set on the basis of the designated voice code recording position (step S56). Thereafter, the designated voice code recording position, the set voice input period and the voice quality as a fixed value are stored as voice code recording parameters in the data memory 109 (step S54). The voice-code-recording-parameter setting processing is then finished, and the program returns to the main routine shown in FIG. 16.

Where the input period is fixed, first, it is determined whether or not the present priority mode is the layout priority mode (step S57), as is shown in FIG. 21. If the present priority mode is the layout priority mode, a voice code recording position is designated using, for example, the operation mode setting button 110A (step S58), thereby setting voice quality that can be obtained by compression based on the designated voice code recording position (step S59). Thereafter, the voice input period as a fixed value, the designated voice code recording position, and the set voice quality are stored as voice code recording parameters in the data memory 109 (step S60). The voice-code-recording-parameter setting processing is then finished, and the program returns to the main routine shown in FIG. 16.

If, on the other hand, it is determined at the step S57 that the present priority mode is not the layout priority mode, voice quality (compressibility) is set using, for example, the operation mode setting button 110A (step S61), thereby setting a voice code recordable position on the basis of the designated voice quality (step S62). Thereafter, the voice input period as a fixed value, the set voice code recording positions and the designated voice quality are stored as voice code recording parameters in the data memory 109 (step S60). The voice-code-recording-parameter setting processing is then finished, and the program returns to the main routine shown in FIG. 16.

Where the voice code recording position is fixed, first, it is determined whether or not the present priority mode is the voice quality priority mode (step S63), as is shown in FIG. 22. If the present priority mode is the voice quality priority mode, voice quality is designated using, for example, the operation mode setting button 110A (step S64), thereby setting, on the basis of the designated voice quality, a period for which a voice can be input (step S65). Thereafter, the set voice input period, the voice code recording position as a fixed value, and the designated voice quality are stored as voice code recording parameters in the data memory 109 (step S66). The voice-code-recording-parameter setting processing is then finished, and the program returns to the main routine shown in FIG. 16.

If, on the other hand, it is determined at the step S63 that the present priority mode is not the voice quality priority mode, a voice input period is designated using, for example, the operation mode setting button 110A (step S67), thereby setting voice quality (compressibility) obtainable based on the designated voice input period (step S68). Thereafter, the designated voice input period, the voice code recording position as a fixed value, and the set voice quality are stored as voice code recording parameters in the data memory 109 (step S66). The voice-code-recording-parameter setting processing is then finished, and the program returns to the main routine shown in FIG. 16.

FIG. 23 is a flowchart useful in explaining photography start processing to be executed at the step S15 in the case of the silver film camera 100.

When processing has been called upon turning on the first release SW of the photography start button 127, first, pre-photography processing such as AE and AF is executed (step S71). Subsequently, it is determined whether or not the voice code recording mode is "valid" (step S72).

If the voice code recording mode is not "valid", the turn on of the second switch, so called second release SW, of the photography start button 127 is waited (step S73). If the second release SW is turned on, known photography processing is executed (step S74). The photography start processing is then finished, and the program returns to the main routine shown in FIG. 12 or FIG. 16. In other words, since the voice code recording mode is "invalid", for example, record start processing (to be executed at a step S75) necessary for recording a voice code image on a printing medium is omitted, which means that such record start processing is disabled.

On the other hand, it is determined at the step S72 that the voice code recording mode is "valid", record start processing is executed (step S75). By the record start processing, a voice registration number, which will be described in detail later, is temporarily stored in the data memory 109. Subsequently, a record corresponding to a voice registration number temporarily stored in the data memory 109 is selected from the voice data header section 136 of the voice data memory 105 (step S76). A photography frame number (a frame number, assigned to a previously photographed picture,+1) is assigned to the selected record (step S77). After that, the program proceeds to a step S73, where it is determined whether or not the second release SW of the photography start button 127 has been turned on. If the answer to the question of the step S73 is Yes, the program proceeds to a step S74, where known photography processing is executed.

Figure 24:
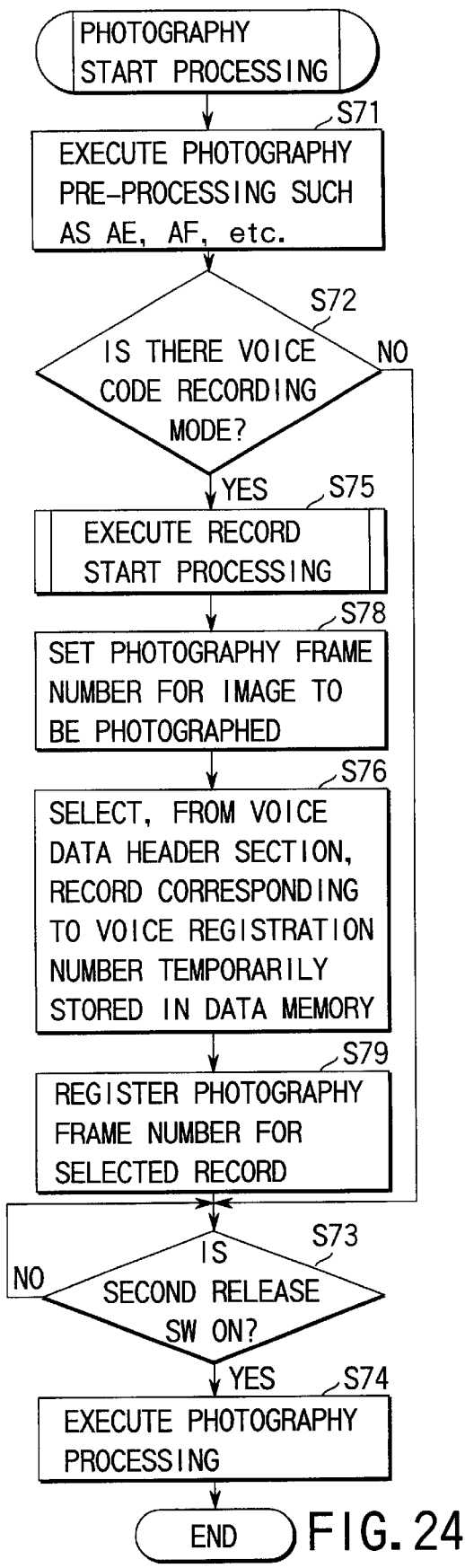
FIG. 24 is a flowchart useful in explaining photography start processing shown in FIGS. 12 and 16, which is executed in the case of an electronic still camera.

In the case of the electronic still camera 300, the flowchart for photography start processing executed at the step S15 is illustrated in FIG. 24. In this case, the processing executed at the steps S71–S75 is similar to the silver film camera 100, and hence no description will be given thereof.

After finishing the record start processing at the step S75, a photography frame number for an image to be photographed is set by the frame number creating section 306 of the system controller 104 (step S78). A record corresponding to a voice registration number temporarily stored in the data memory 109 is selected from the voice data header section 307 of the image data memory 301 (step S76). The set photography frame number is assigned to the selected record (step S79). After that, the program proceeds to a step S73, where it is determined whether or not the second release SW of the photography start button 127 has been turned on. If the answer to the question of the step S73 is Yes, the program proceeds to a step S74, where known photography processing is executed.

Although in the above description, recording automatically starts, it is a matter of course that a button for manually starting recording is provided for enabling the user to manually start recording by pushing the button.

Figure 25:
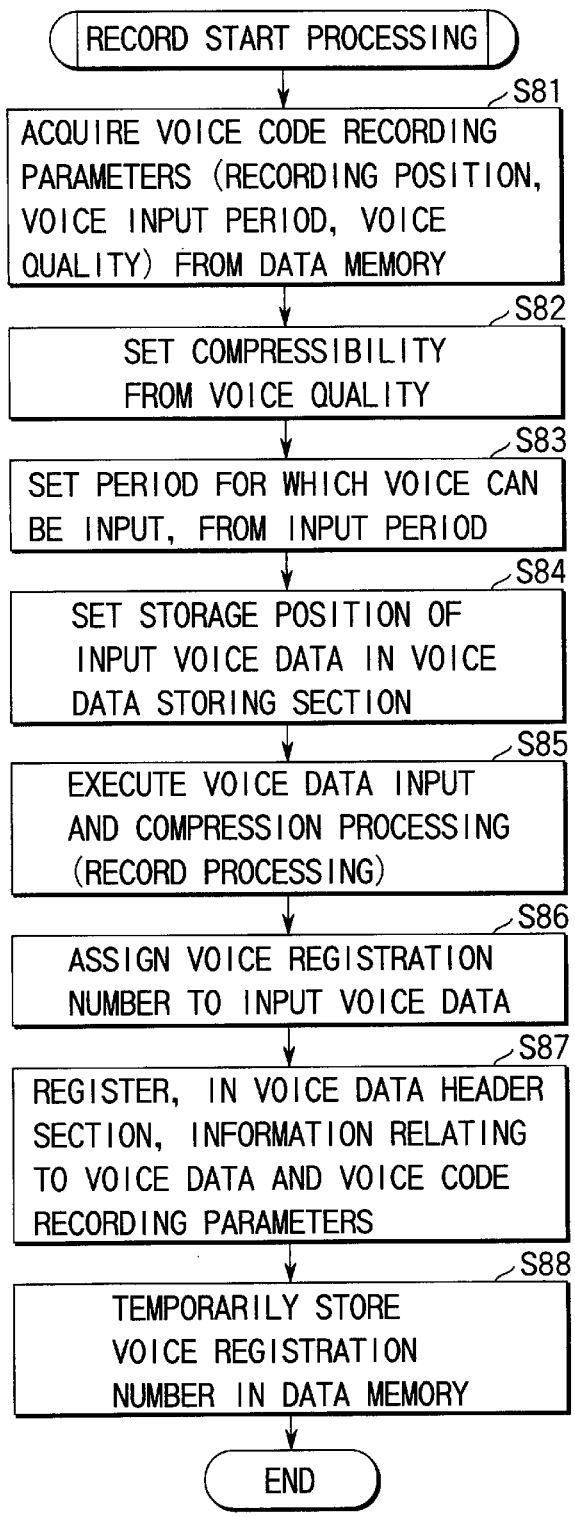
FIG. 25 is a flowchart useful in explaining record start processing shown in FIGS. 23 and 24.

The record start processing at the step S75 is executed as shown in FIG. 25.

First, voice code recording parameters (the recording position, voice input period and voice quality) stored in the data memory 109 by the parameter setting processing (or the voice-code-recording-parameter setting processing) are read out (step S81). From the voice quality included in the read-out parameters, a compressibility used in the voice compression/expansion circuit 103 is set (step S82). Further, from the input period, a period for which a voice can be input is set (step S83). Furthermore, a position for storing input voice data is set in the voice data storage section 137 of the voice data memory 105 (or the voice data storage section 308 of the image data memory 301) (step S84).

Thereafter, input of voice data through the microphone 101A and compression processing by voice compression/expansion circuit 103, i.e. recording processing is performed, thereby storing the input voice data in the set position in the voice data storing section 137 (or voice data storing section 308) (step S85). A voice registration number is assigned to each input voice data item, thus adding a record in the voice data header section 136 of the voice data memory 105 (or in the voice data header section 307 of the image data memory 301) (step S86). Then, information relating to the voice data and the voice code recording parameters are registered for the record in the voice data header section 136 (or the voice data storing section 308) (step S87). The assigned voice registration number is temporarily stored in the data memory 109 (step S88). At this stage, relating data to each image is not yet executed. The record start processing is then finished, and the program returns to the routine of the photography start processing shown in FIG. 23 or FIG. 24.

[Second Embodiment]

A second embodiment of the invention will be described. The second embodiment is directed to a case where the aforementioned predetermined operation that is executable when the first mode is set includes each operation executed in the voice input section 10, the digital converting section 11, the voice compression section 12 and the encoding section 18.

Figure 26:
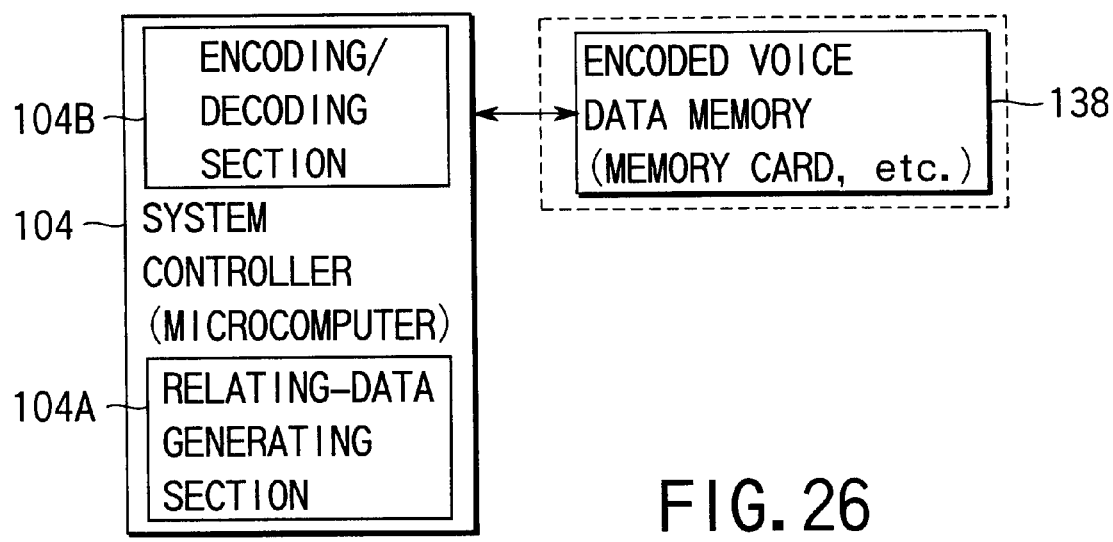
FIG. 26 is a view illustrating a characterizing section of a silver film camera to which a photography device according to a second embodiment is applied.

Specifically, where the second embodiment is applied, the silver film camera 100 additionally incorporates, in the system controller 104, an encoding/decoding section 104B corresponding to the encoding section 18, as is shown in FIG. 26. Further, the camera 100 uses an encoded voice data memory 138 instead of the voice data memory 105.

In this camera, digital voice data subjected to voice compression processing in the voice compression/expansion circuit 103 is encoded into a form suitable for recording by the encoding/decoding section 104B of the system controller 104. The encoded data is written into the encoded voice data memory 138. To confirm/reproduce the contents of the encoded voice data stored in the encoded voice data memory 138, this data is decoded by the encoding/decoding section 104B and supplied to the voice compression/expansion circuit 103.

Although the storage format of the encoded voice data memory 138 is not shown, the memory 138 is divided into an encoded-voice-data header section and an encoded-voice-data storing section. Each data item encoded by the encoding/decoding section 104B is stored in the encoded-voice-data storing section 138, while registration information for each encoded voice data item is stored in the encoded-voice-data header section. The encoded-voice-data header section stores, as one record for each encoded voice data item, a voice registration number, a photography frame number, a voice code recording position, a date, a time, an input time period, a start address, a data size, a compression method, comments, etc., as in the case of the voice data header section 136.

To apply the second embodiment to the electronic still camera 300, it suffices if similar changes to those made to the silver film camera are made. Accordingly, no illustration and detailed description will be given of this case.

The second embodiment operates in a manner similar to the first embodiment, except for the steps S75 and S76 of the photography start processing.

Specifically, at the step S76 of the second embodiment, the section that selects one of the voice registration numbers temporarily stored in the data memory 109 is changed from the voice data header section to the encoded-voice-data header section.

Figure 27:
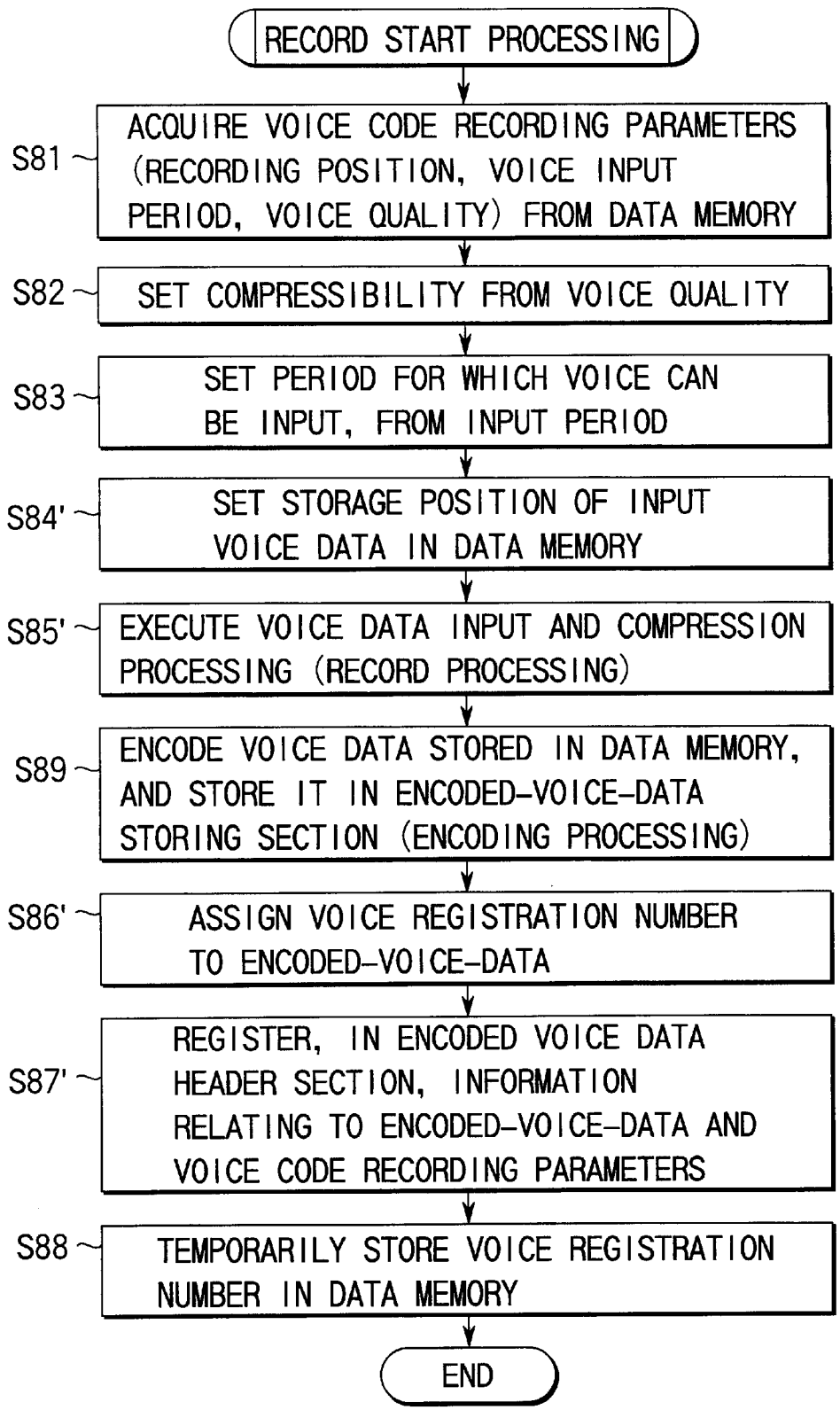
FIG. 27 is a flowchart for explaining record start processing executed in the second embodiment.

Moreover, the record start processing is executed at the step S75 in a manner as illustrated in the flowchart of FIG. 27.

Specifically, as in the first embodiment, voice code recording parameters stored in the data memory 109 are read out (step S81). Subsequently, compressibility to be used in the voice compression/expansion circuit 103 is set from voice quality included in the parameters (step S82), and a period for which a voice can be input is set from an input period included in the parameters (step S83).

In the second embodiment, the storage position of input voice data is set in the data memory 109 but not in the voice data storage (step S84'). After that, voice input and compression processing (i.e. recording processing) of the input voice are executed by the microphone 101A and the voice compression/expansion circuit 103, respectively, thereby storing the resultant data into the set storage position of the data memory 109 (step S85'). Furthermore, in the second embodiment, the voice data stored in the data memory 109 is encoded by the encoding/decoding section 104B, thereby storing the resultant encoded voice data in the encoded-voice-data storing section of the encoded voice data memory 138 (or the image data memory 301) (step S89). Thereafter, a voice registration number is assigned to each encoded voice data item, thus adding a record in the encoded-voice-data header section of the encoded voice data memory 138 (or the image data memory 301) (step S86'). Then, information relating to the encoded-voice-data and the voice code recording parameters are registered for the record in the encoded-voice-data header section (step S87').

The assigned voice registration number is temporarily stored in the data memory 109 (step S88). The record start processing is then finished.

[Third Embodiment]

A third embodiment will be described. The third embodiment is directed to a case where the aforementioned predetermined operation that is executable when the first mode is set includes each operation executed in the voice input section 10, the digital converting section 11, the voice compression section 12, the encoding section 18 and the voice code image data generating section 19.

Figure 28:
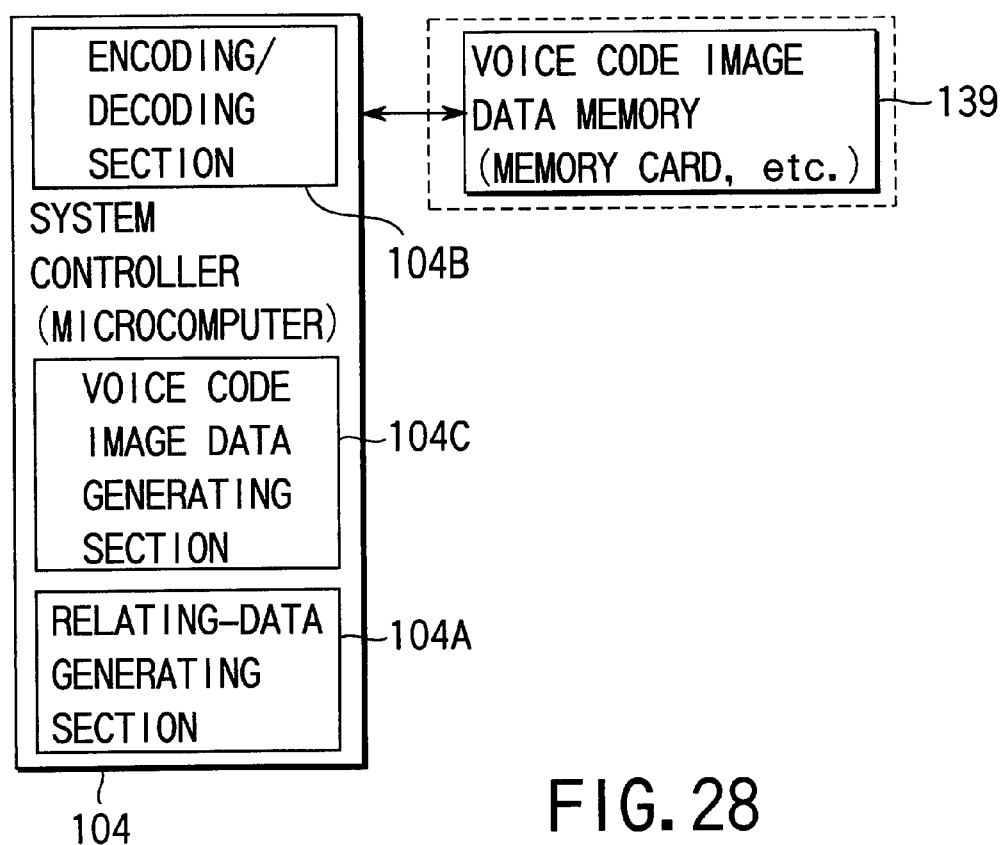
FIG. 28 is a view illustrating a characterizing section of a silver film camera to which a photography device according to a third embodiment is applied.

Specifically, where the third embodiment is applied, the silver film camera 100 additionally incorporates, in the system controller 104 of the camera that the second embodiment is applied, a voice code image data generating section 104C corresponding to the voice code image data generating section 19, as is shown in FIG. 28. Further, the camera 100 uses a voice code image data memory 139 instead of the encoded voice data memory 138 in the second embodiment.

Specifically, the voice code image generating section 104C in the system controller 104 creates image data corresponding to the voice code image 21 from voice data encoded by the encoding/decoding section 104B, and writes the created voice code image data into the voice code image data memory 139.

Although the storage format of the voice code image data memory 139 is not shown, the memory 139 is divided into a voice code image data header section and a voice code image data storing section. Each voice code image data item created by the voice code image data generating section 104C is stored in the voice code image data storing section, while registration information for each voice code image data item is stored in the voice code image data header section. The voice code image data header section stores, as one record for each voice code image data item, a voice registration number, a photography frame number, a voice code recording position, a date, a time, an input time period, a start address, a data size, a compression method, comments, etc., as in the case of the voice data header section 136 of the first embodiment.

To apply the third embodiment to the electronic still camera 300, it suffices if similar changes to those made to the silver film camera are made. Accordingly, no illustration and detailed description will be given of this case.

The third embodiment operates in a manner similar to the first embodiment, except for the steps S75 and S76 of the photography start processing.

Specifically, at the step S76 of the third embodiment, the section that selects one of the voice registration numbers temporarily stored in the data memory 109 is changed from the voice data header section to the voice code image data header section.

Figure 29:
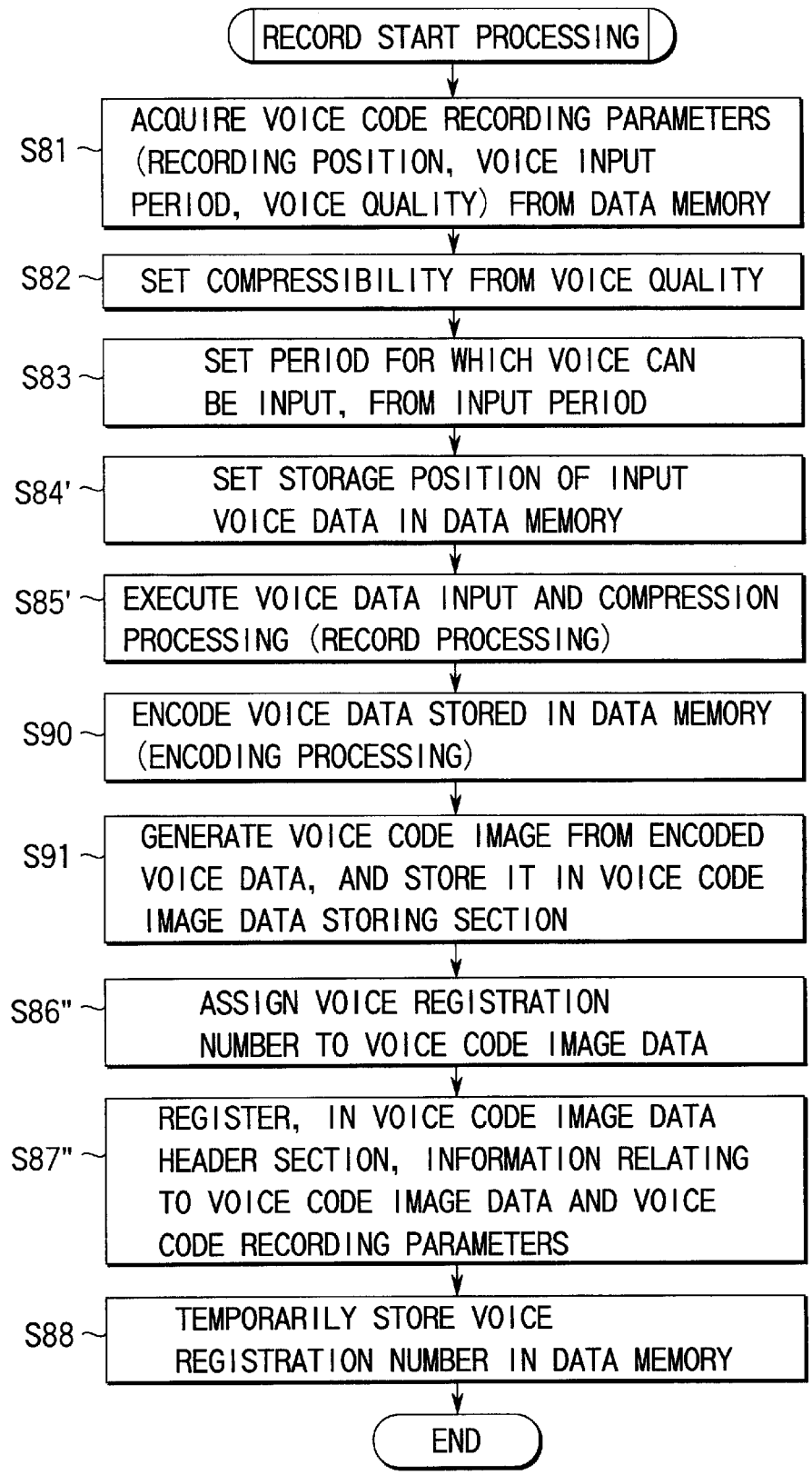
FIG. 29 is a flowchart for explaining record start processing executed in the third embodiment.

Moreover, the record start processing is executed at the step S75 in a manner as illustrated in the flowchart of FIG. 29.

Specifically, as in the first embodiment, voice code recording parameters stored in the data memory 109 are read out (step S81). Subsequently, compressibility to be used in the voice compression/expansion circuit 103 is set from voice quality included in the parameters (step S82), and a period for which a voice can be input is set from an input period included in the parameters (step S83).

In the third embodiment, the storage position of input voice data is set in the data memory 109 but not in the voice data storage (step S84'). After that, voice input and compression processing (i.e. recording processing) of the input voice are executed by the microphone 101A and the voice compression/expansion circuit 103, respectively, thereby storing the resultant data into the set storage position of the data memory 109 (step S85').

Furthermore, in the third embodiment, the voice data stored in the data memory 109 is encoded by the encoding/decoding section 104B (step S90). Thereafter, a voice code image is created by the voice code image data generating section 104C on the basis of the encoded voice data, and then stored in the voice code image data storing section of the voice code image data memory 139 (or the image data memory 301) (step S91).

Subsequently, a voice registration number is assigned to each input voice code image data item, thus adding a record in the voice code image data header section of the voice code image data memory 139 (or the image data memory 301) (step S86"). Then, information relating to the voice code image data and the voice code recording parameters are registered for the record in the voice code image data header section (step S87").

The assigned voice registration number is temporarily stored in the data memory 109 (step S88). The record start processing is then finished.

[Fourth Embodiment]

A fourth embodiment will be described. The fourth embodiment is directed to a case where the aforementioned predetermined operation that is executable when the first mode is set includes each operation executed in the voice input section 10, the digital converting section 11, the voice compression section 12, the encoding section 18, the voice code image data generating section 19 and the recording section 16B.

Specifically, where the fourth embodiment is applied, the silver film camera 100 incorporates a recording section (printer unit) 500 corresponding to the recording section 16B, as is shown in FIG. 30. The recording section 500 is detachably attached to the main body of the silver film camera 100, and disposed to record the voice code image 21 on a label printing medium (not shown).

To this end, the system controller 104 includes an encoding/decoding section 104B corresponding to the encoding section 18, and a voice code image data generating section 104C corresponding to the voice code image data generating section 19.

The system controller 104 reads voice data from the voice data memory 105, encodes the data using the encoding/decoding section 104B, and creates voice code image data corresponding to the voice code image data 21 from the encoded data, using the voice code image data generating section 104C. The controller 104 then supplies the generated voice code image data to the recording section 500, thereby recording the voice code image 21.

Figure 31A:
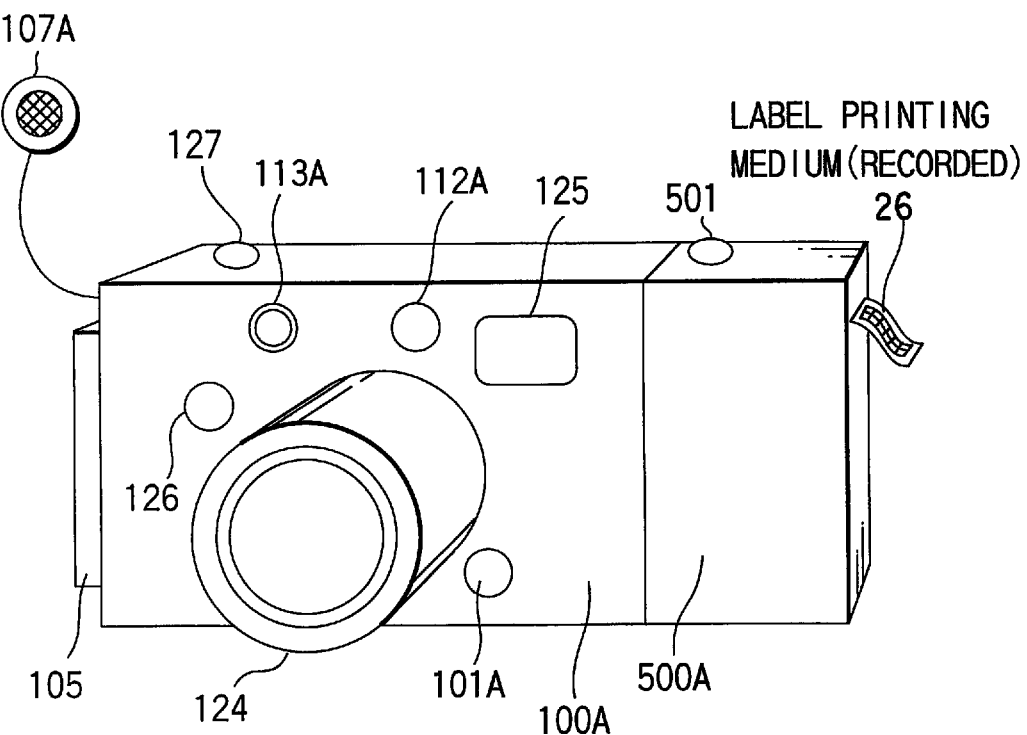
FIG. 31A is a view showing the outward appearance of a front section of the silver film camera to which the photography device according to the fourth embodiment is applied.
Figure 31B:
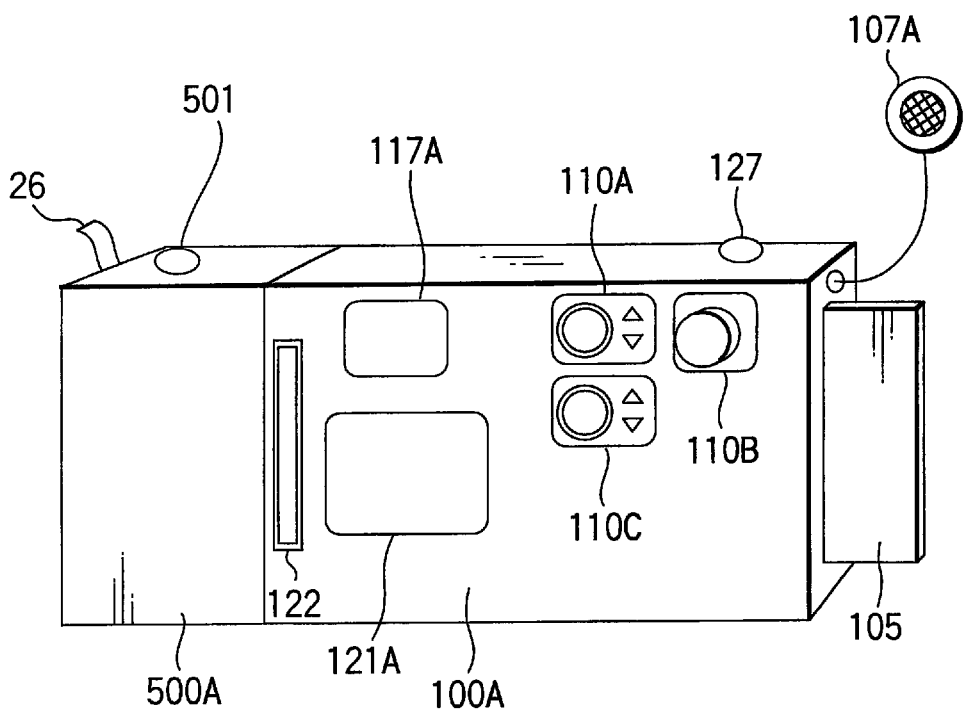
FIG. 31B is a view showing the outward appearance of a rear section of the silver film camera to which the photography device according to the fourth embodiment is applied.

FIGS. 31A and 31B show the outward appearance of the silver film camera 100 according to the fourth embodiment. As shown, a voice code image recording section 500A as the detachable recording section 500 is attached to a side surface of the camera body 100A. A record start button 501 is provided on the upper surface of the voice code image recording section 500A for instructing the system controller 104 to start recording the voice code image 21 onto a label printing medium 26.

To apply the fourth embodiment to the electronic still camera 300, it suffices if similar changes to those made to the silver film camera are made. Accordingly, no illustration and detailed description will be given of this case. However, since in this case, a photographed image is stored in the image data memory 301, a recording section for recording the voice code image 21 and the photographed still image 22 on a recording medium can be used, as well as the voice code image recording section 500A such as a label printer, as in the case of the printing medium 23 shown in FIGS. 3 and 4.

The fourth embodiment operates in a manner similar to the first embodiment, except that processing as shown in FIG. 32 is added to the main routine.

Specifically, in the fourth embodiment, it is determined at a step S36 whether or not the record start button 501 is turned on after the parameter setting processing at the step S18 or the voice code recording parameter setting processing at the step S35. If the button is not turned on, the program returns to the step S12. On the other hand, if the button is turned on, print start processing is executed (step S37), followed by the program returning to the step S12.

The print start processing is executed at the step S37 in a manner as illustrated in the flowchart of FIG. 33.

First, it is determined whether or not the voice code image recording section 500A as the detachable printer is attached (step S101). If it is determined that the section 500A is not attached, the print start processing is finished since printing cannot be executed, followed by the program returning to the main routine.

If, on the other hand, the voice code image recording section 500A is attached, a voice registration number selected at this time or in advance by menu selection using a dedicated button (not shown) or the operation mode setting button 110A is designated (step S102). After that, voice data corresponding to the voice registration number is read from the voice data storing section 137 of the voice data memory 105 (step S103). The encoding/decoding section 104B encodes the read voice data (step S104), and the voice code image data generating section 104C generates voice code image data from the encoded voice data (step S105).

Subsequently, referring to a record corresponding to the designated voice registration number and stored in the voice data header section 136 of the voice data memory 105, it is determined whether or not a frame number as relating data is registered (step S106). If no frame number is registered, the program proceeds to a step S108 which will be described later. On the other hand, if the frame number is registered, it is attached to the generated voice code image data (step S107). Then, the generated voice code image data or the voice code image data with the frame number is printed (step S108). After printing, the print start processing is finished, and the program returns to the main routine.

The present invention has been described on the basis of the embodiments thereof. However, the invention is not limited to the embodiments, but can be modified in various manners without departing from its scope. The features of the present invention can be summarized as follows:

(1) A photography device for use in a photography image processing system which can print an optically readable voice code image on a printing medium on which a photographed still image is to be printed, comprising:

a voice input section for inputting a voice corresponding to the voice code image;

a mode setting section for setting one of a first mode that enables a predetermined operation necessary for recording, on the printing medium, a voice code image based on the voice input by the voice input section, and a second mode that disables the predetermined operation necessary for recording, on the printing medium, the voice code image based on the voice input by the voice input section; and a display section for displaying whether the first mode or the second mode is set by the mode setting section.

In the above structure, there are provided the first mode for enabling processing necessary for creating a voice code image, and the second mode for disabling the processing, and whether the first or second mode is set is displayed. Accordingly, the photographer can reliably and simply select to execute or not to execute processing for recording a voice code image on a printing medium. As a result, the photography device has a high operability.

(2) A photography device according to item (1), characterized by further comprising:

an encoding section for encoding data based on a voice input by the voice input section, into a form suitable for recording; and a control section for enabling the voice input section and the encoding section to execute their respective operations when the mode setting section sets the first mode, and disabling the operations of the voice input section and the encoding section when the mode setting section sets the second mode.

The photography device has, as well as the advantage recited in item (1), the advantage that the time required for recording a voice code image can be shortened, since the input voice data is encoded by the encoding section.

(3) A photography device according to item (1), characterized by further comprising:

an encoding section for encoding data based on a voice input by the voice input section, into a form suitable for recording;

a voice code image data generating section for generating voice code image data corresponding to the voice code image, from the data encoded by the encoding section; and a control section for enabling the voice input section, the encoding section and the voice code image data generating section to execute their respective operations when the mode setting section sets the first mode, and disabling the operations of the voice input section, the encoding section and the voice code image data generating section when the mode setting section sets the second mode.

The photography device has, as well as the advantage recited in item (1), the advantage that the time required for recording a voice code image can be shortened, since the input voice data is recorded as voice code image data by the encoding section and the voice code image data generating section.

(4) A photography device according to item (1), characterized by further comprising:

an encoding section for encoding data based on a voice input by the voice input section, into a form suitable for recording;

a voice code image data generating section for generating voice code image data corresponding to the voice code image, from the data encoded by the encoding section;

a recording section for recording the voice code image on a printing medium on the basis of the voice code image data generated by the voice code image data generating section; and a control section for enabling the voice input section, the encoding section, the voice code image data generating section and the recording section to execute their respective operations when the mode setting section sets the first mode, and disabling the operations of the voice input section, the encoding section, the voice code image data generating section and the recording section when the mode setting section sets the second mode.

The photography device has, as well as the advantage recited in item (1), the advantage that the input voice data can be created, as a voice code image to be recorded on a printing medium without using any recording device, by the encoding section, the voice code image data generating section and the recording section.

(5) A photography device according to item (4), characterized in that while the mode setting section sets the first mode, and the recording section executes its operation, the control section prohibits a voice input operation by the voice input section.

Since the voice input operation is prohibited during recording a voice code image, a target voice can be input reliably without inputting the operation sound of the device which occurs during recording.

(6) A photography device according to item (1), characterized in that when the mode setting section sets the first mode, a layout determining mode is set for determining a recording position of the voice code image on the printing medium.

The layout determining mode enables the user to set a desirable recording position of a voice code image on the printing medium. Accordingly, the user can record a voice code image in accordance with a photographed still image.

(7) A photography device according to item (1), characterized in that when the mode setting section sets the first mode, an input period determining mode is set for determining a period for which a voice can be input.

The input period determining mode enables the user to set a desirable period for which a voice code image can be recorded on the printing medium. Accordingly, the user can input voice for a period suitable for the circumstances.

(8) A photography device according to item (1), characterized in that when the mode setting section sets the first mode, a voice quality determining mode is set for determining quality of the voice.

The voice quality determining mode enables the user to set a desirable voice compressibility when inputting a voice. Accordingly, the user can input voice with voice quality (compressibility) corresponding to the type of the voice.

(9) A photography device according to item (1), characterized in that when the mode setting section sets the first mode, one of an input period priority mode and a layout priority mode can be selected, the input period priority mode being a mode wherein the predetermined operation is executed in a state in which an input period of the voice has a higher priority than a recording position of the voice code image on the printing medium, and the layout priority mode being a mode wherein the predetermined operation is executed in a state in which the recording position of the voice code image on the printing medium has a higher priority than the input period of the voice.

Switching between the input period priority mode and the layout priority mode enables setting of the input period priority mode when the vice code image recording position is determined on the basis of the voice input period, and enables setting of the layout priority mode when the voice input period is determined on the basis of the voice code image recording position. As a result, the user can execute processing for recording a voice code image on a photographed still image, by a simple operation and in accordance with a purpose or circumstances.

(10) A photography device according to item (1), characterized in that when the mode setting section sets the first mode, one of a voice quality priority mode and a layout priority mode can be selected, the voice quality priority mode being a mode wherein the predetermined operation is executed in a state in which quality of the voice has a higher priority than a recording position of the voice code image on the printing medium, and the layout priority mode being a mode wherein the predetermined operation is executed in a state in which the recording position of the voice code image on the printing medium has a higher priority than the quality of the voice.

Switching between the voice quality priority mode and the layout priority mode enables setting of the voice quality priority mode when the vice code image recording position is determined on the basis of the voice compressibility assumed when inputting the voice, and enables setting of the layout priority mode when the voice quality, i.e. the voice compressibility, assumed when inputting the voice is determined on the basis of the voice code image recording position. As a result, the user can execute processing for recording a voice code image on a photographed still image, by a simple operation and in accordance with a purpose or circumstances.

(11) A photography device according to item (1), characterized in that when the mode setting section sets the first mode, one of a voice quality priority mode and an input period priority mode can be selected, the voice quality priority mode being a mode wherein the predetermined operation is executed in a state in which quality of the voice has a higher priority than an input period of the voice, and the input period priority mode being a mode wherein the predetermined operation is executed in a state in which the input period of the voice has a higher priority than the quality of the voice.

Switching between the voice quality priority mode and the input period priority mode enables setting of the voice quality priority mode when the voice input period is determined on the basis of the voice quality based on the voice compressibility that is assumed when inputting the voice, and enables setting of the voice input period priority mode when the voice quality based on the voice compressibility that is assumed when inputting the voice is determined on the basis of the voice input period. As a result, the user can execute processing for recording a voice code image on a photographed still image, by a simple operation and in accordance with a purpose or circumstances.

(12) A photography device according to item (1), characterized in that the display section is provided at least one of in a photography finder incorporated in the photography device, and on an exterior of the photography device.

Since each mode is displayed in the photography finder or on an exterior of the photography device, the user can instantly confirm which mode is the present mode, which means that an operation for setting each mode can be executed in a reliable manner.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A photography device for use in a photography image processing system which can print an optically readable voice code image on a printing medium on which a photographed still image is to be printed, comprising:

a voice input section for inputting a voice corresponding to the voice code image;

a mode setting section for setting one of a first mode that enables a predetermined operation necessary for recording, on the printing medium, a voice code image based on the voice input by said voice input section, and a second mode that disables the predetermined operation necessary for recording, on the printing medium, the voice code image based on the voice input by said voice input section; and a display section for displaying whether the first mode or the second mode is set by said mode setting section;

wherein when said mode setting section sets the first mode, one of an input period priority mode and a layout priority mode can be further selected, the input period priority mode being a mode wherein the predetermined operation is executed in a state in which an input period of the voice has a higher priority than a recording position of the voice code image on the printing medium, and the layout priority mode being a mode wherein the predetermined operation is executed in a state in which the recording position of the voice code image on the printing medium has a higher priority than the input period of the voice.

2. A photography device for use in a photography image processing system which can print an optically readable voice code image on a printing medium on which a photographed still image is to be printed, comprising:

a voice input section for inputting a voice corresponding to the voice code image;

a mode setting section for setting one of a first mode that enables a predetermined operation necessary for recording, on the printing medium, a voice code image based on the voice input by said voice input section, and a second mode that disables the predetermined operation necessary for recording, on the printing medium, the voice code image based on the voice input by said voice input section; and a display section for displaying whether the first mode or the second mode is set by said mode setting section;

wherein when said mode setting section sets the first mode, one of a voice quality priority mode and a layout priority mode can be further selected, the voice quality priority mode being a mode wherein the predetermined operation is executed in a state in which quality of the voice has a higher priority than a recording position of the voice code image on the printing medium, and the layout priority mode being a mode wherein the predetermined operation is executed in a state in which the recording position of the voice code image on the printing medium has a higher priority than the quality of the voice.

3. A photography device for use in a photography image processing system which can print an optically readable voice code image on a printing medium on which a photographed still image is to be printed, comprising:

a voice input section for inputting a voice corresponding to the voice code image;

a mode setting section for setting one of a first mode that enables a predetermined operation necessary for recording, on the printing medium, a voice code image based on the voice input by said voice input section, and a second mode that disables the predetermined operation necessary for recording, on the printing medium, the voice code image based on the voice input by said voice input section; and a display section for displaying whether the first mode or the second mode is set by said mode setting section;

wherein when said mode setting section sets the first mode, one of a voice quality priority mode and a layout priority mode can be further selected, the voice quality priority mode being a mode wherein the predetermined operation is executed in a state in which quality of the voice has a higher priority than an input period of the voice, and the input period priority mode being a mode wherein the predetermined operation is executed in a state in which the input period of the voice has a higher priority than the quality of the voice.

4. A photography device for use in a photography image processing system which can print an optically readable voice code image on a printing medium on which a photographed still image is to be printed, comprising:

a mode setting section for setting one of a first mode that enables a predetermined operation necessary for recording, on the printing medium, a voice code image based on the voice input by said voice input section, and a second mode that disables the predetermined operation necessary for recording, on the printing medium, the voice code image based on the voice input by said voice input section; and a display section for displaying whether the first mode or the second mode is set by said mode setting section;

wherein when the first mode is set by the mode setting section, an input period priority mode can be further selected, the input period priority mode being a mode wherein the predetermined operation is executed in a state in which an input period of the voice has a higher priority than a recording position of the voice code image on the printing medium and quality of the voice.

5. A photography device for use in a photography image processing system which can print an optically readable voice code image on a printing medium on which a photographed still image is to be printed, comprising:

a mode setting section for setting one of a first mode that enables a predetermined operation necessary for recording, on the printing medium, a voice code image based on the voice input by said voice input section, and a second mode that disables the predetermined operation necessary for recording, on the printing medium, the voice code image based on the voice input by said voice input section; and a display section for displaying whether the first mode or the second mode is set by said mode setting section;

wherein when the first mode is set by the mode setting section, a layout priority mode can be further selected, the layout priority mode being a mode wherein the predetermined operation is executed in a state in which a recording position of the voice code image on the printing medium has a higher priority than quality of the voice and an input period of the voice.

6. A photography device for use in a photography image processing system which can print an optically readable voice code image on a printing medium on which a photographed still image is to be printed, comprising:

a mode setting section for setting one of a first mode that enables a predetermined operation necessary for recording, on the printing medium, a voice code image based on the voice input by said voice input section, and a second mode that disables the predetermined operation necessary for recording, on the printing medium, the voice code image based on the voice input by said voice input section; and a display section for displaying whether the first mode or the second mode is set by said mode setting section;

wherein when the first mode is set by the mode setting section, a voice quality priority mode can be further selected, the voice quality priority mode being a mode wherein the predetermined operation is executed in a state in which quality of the voice has a higher priority than an input period of the voice and a recording position of the voice code image on the printing medium.

* * * * *